US012619474B2

(12) United States Patent (10) Patent No.: US 12,619,474 B2
You et al. (45) Date of Patent: May 5, 2026

(54) DYNAMIC POD RESOURCE LIMIT ADJUSTING BASED ON DATA ANALYTICS

(71) Applicant: INTERNATIONAL BUSINESS MACHINES CORPORATION, Armonk, NY (US)

(72) Inventors: Jing You, Beijing (CN); Kun Yang, Beijing (CN); Peng Hui Jiang, Beijing (CN); Sushma Hiremath, Dharwad (IN); Qian Du, Beijing (CN); Amit Anand, Bangalore (IN); Khushboo Singh, Bangalore (IN); Kumari Muktta, Ranchi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 466 days.

(21) Appl. No.: 18/312,625

(22) Filed: May 5, 2023

(65) Prior Publication Data

US 2024/0370307 A1     Nov. 7, 2024

(51) Int. Cl.
*G06F 9/50*     (2006.01)

(52) U.S. Cl.
CPC .......... *G06F 9/5077* (2013.01); *G06F 9/5083* (2013.01); *G06F 2209/504* (2013.01); *G06F 2209/508* (2013.01)

(58) Field of Classification Search
None
See application file for complete search history.

(56) References Cited

U.S. PATENT DOCUMENTS 9,009,294 B2     4/2015   Dawson et al.
9,246,840 B2     1/2016   Anderson et al.
(Continued)

FOREIGN PATENT DOCUMENTS

EP     2 483 778 B1     9/2019
EP     3 195 570 B1     10/2020
(Continued)

OTHER PUBLICATIONS

International Search Report & Written Opinion for PCT Application No. PCT/EP2024/062032, dated Jul. 12, 2024 (11 pages) (Year: 2024).

(Continued)

*Primary Examiner* — Sisley N Kim
(74) *Attorney, Agent, or Firm* — Lily Neff, Esq; Kevin P. Radigan, Esq.; Heslin Rothenberg Farley & Mesiti P.C.

(57) ABSTRACT
Dynamic adjusting of pod resource limits is provided at runtime of a container orchestration platform pod. The process includes deploying a container orchestration platform pod with one or more pod resources in a computing environment, where the pod resources have one or more associated pod resource limits. Further, the process includes monitoring a runtime resource usage of the container orchestration platform pod, and predicting, by a trained machine learning model, upcoming resource usage of the container orchestration platform pod. The predicting uses, at least in part, the monitored runtime resource usage. Further, the process includes dynamically adjusting a pod resource limit of the one or more pod resource limits of the container orchestration platform pod in the computing environment. The dynamically adjusting is based on the monitored runtime resource usage, and the predicted upcoming resource usage.

20 Claims, 12 Drawing Sheets

(56) References Cited

U.S. PATENT DOCUMENTS

| | | | |
|---|---|---|---|
| 11,245,748 B1 | 2/2022 | Hannon | |
| 2019/0102226 A1* | 4/2019 | Caldato | G06F 11/362 |
| 2019/0205157 A1 | 7/2019 | Bianchini et al. | |
| 2019/0227847 A1 | 7/2019 | Jha et al. | |
| 2021/0141655 A1 | 5/2021 | Gamage et al. | |
| 2021/0194770 A1* | 6/2021 | Bhatnagar | G06F 9/5038 |
| 2021/0303365 A1 | 9/2021 | Li et al. | |
| 2023/0229511 A1* | 7/2023 | Panikkar | G06F 9/5038 |
| | | | 718/104 |
| 2023/0280996 A1* | 9/2023 | Torres | G06F 8/72 |

FOREIGN PATENT DOCUMENTS

| | | | |
|---|---|---|---|
| WO | WO2022073585 A1 | 4/2022 | |
| WO | 2024/231207 A1 | 11/2024 | |

OTHER PUBLICATIONS

Lahu, Shelar Prasad, "Dynamic Resources allocation using Priority Aware scheduling in Kubernetes," Mar. 20, 2020, pp. 1-42 (Year: 2020).

Sami, Hani et al., "FScaler: Automatic Resource Scaling of Containers in Fog Clusters Using Reinforcement Learning," 2020 International Wireless Communications and Mobile Computing, Jun. 2019, pp. 1824-1829 (Year: 2020).

Toka, Laszlo et al., "Machine Learning-Based Scaling Management for Kubernetes Edge Clusters," IEEE Transactions on Network and Service Management, vol. 18, No. 1, Mar. 2021, pp. 958-972 (Year: 2021).

* cited by examiner

100

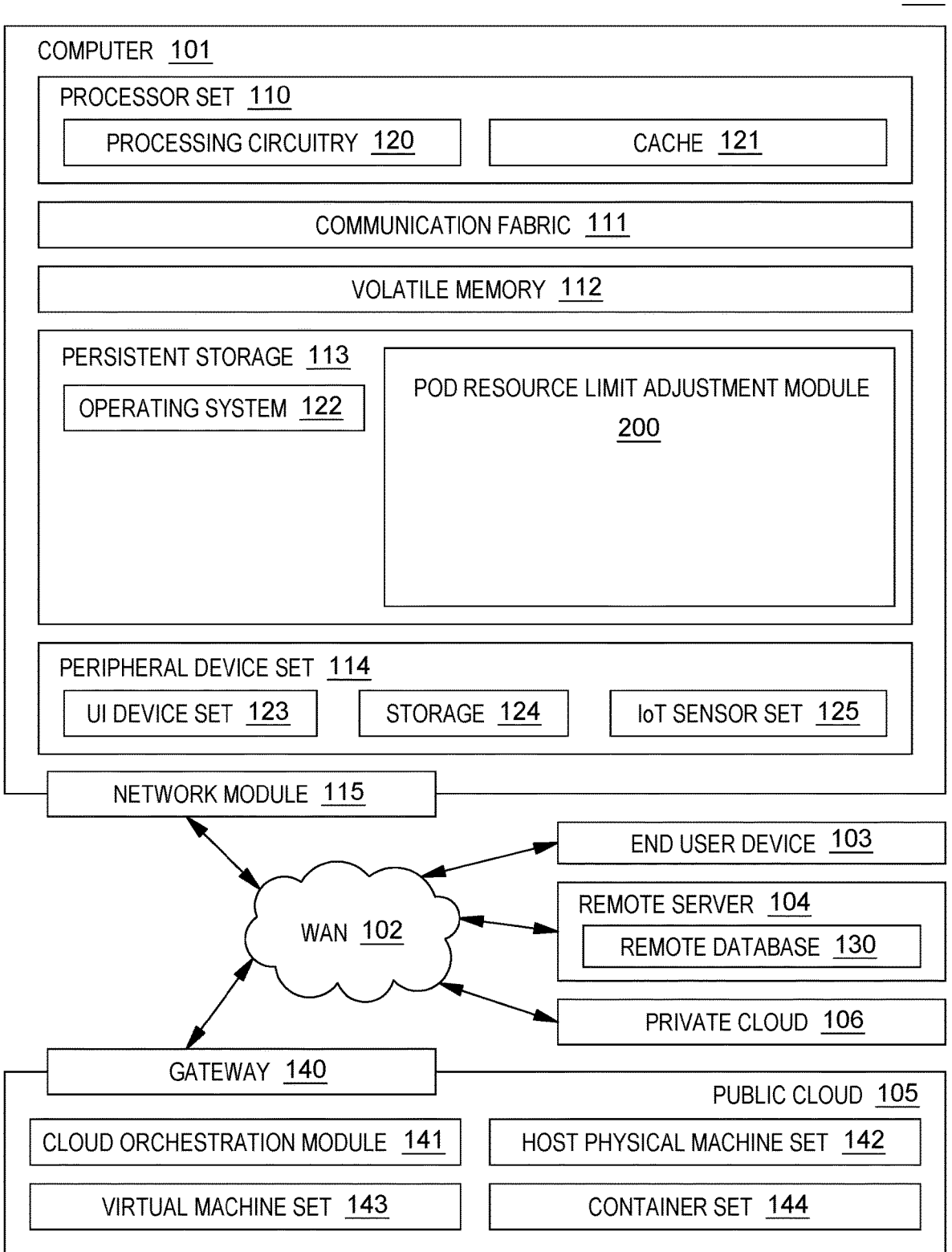

COMPUTER  101

PROCESSOR SET  110

PROCESSING CIRCUITRY  120

CACHE  121

COMMUNICATION FABRIC  111

VOLATILE MEMORY  112

PERSISTENT STORAGE  113

OPERATING SYSTEM  122

POD RESOURCE LIMIT ADJUSTMENT MODULE
200

PERIPHERAL DEVICE SET  114

UI DEVICE SET  123

STORAGE  124

IoT SENSOR SET  125

NETWORK MODULE  115

WAN  102

END USER DEVICE  103

REMOTE SERVER  104

REMOTE DATABASE  130

PRIVATE CLOUD  106

GATEWAY  140

PUBLIC CLOUD  105

CLOUD ORCHESTRATION MODULE  141

HOST PHYSICAL MACHINE SET  142

VIRTUAL MACHINE SET  143

CONTAINER SET  144

FIG. 1

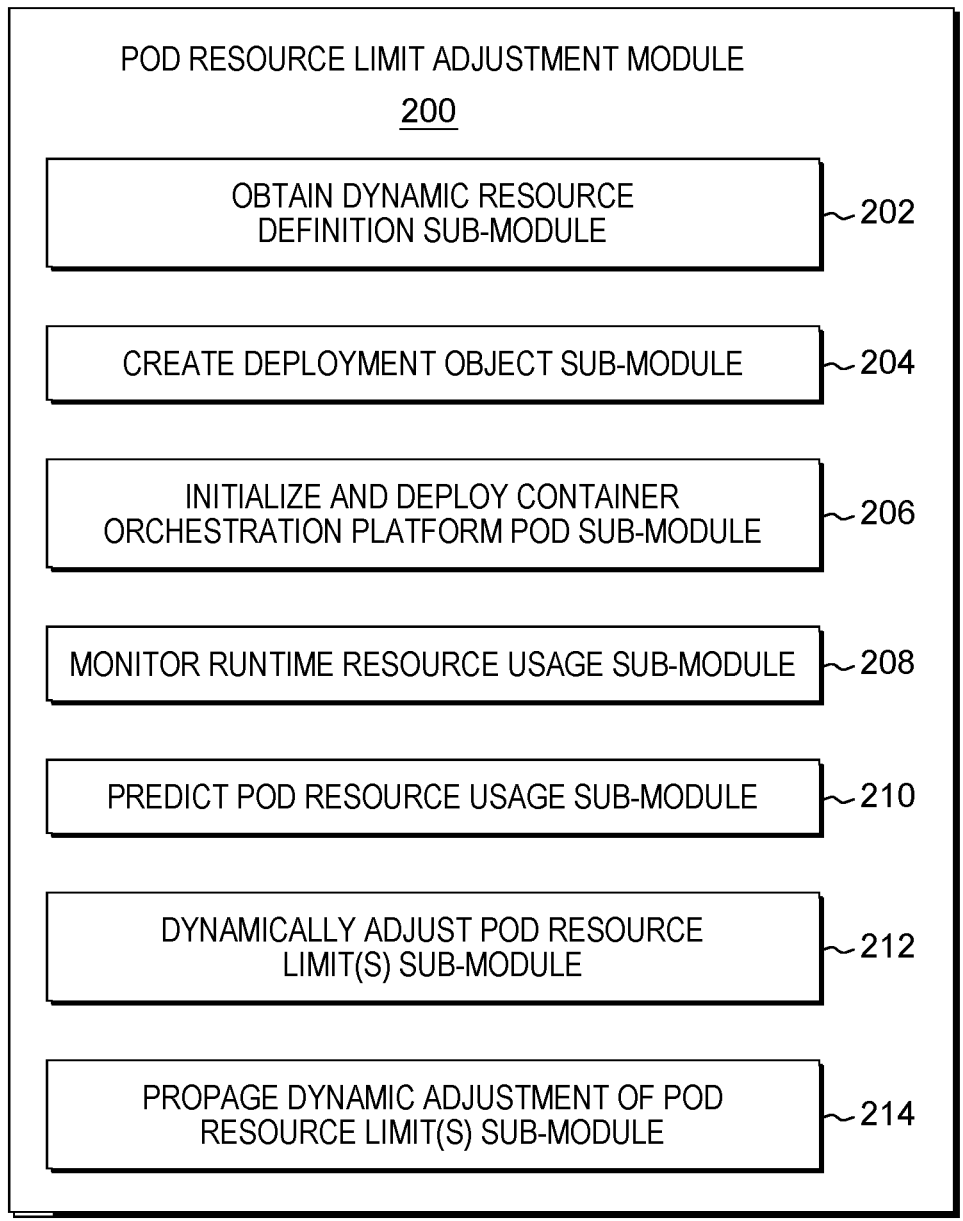

POD RESOURCE LIMIT ADJUSTMENT MODULE
200

OBTAIN DYNAMIC RESOURCE
DEFINITION SUB-MODULE                    ~202

CREATE DEPLOYMENT OBJECT SUB-MODULE      ~204

INITIALIZE AND DEPLOY CONTAINER
ORCHESTRATION PLATFORM POD SUB-MODULE    ~206

MONITOR RUNTIME RESOURCE USAGE SUB-MODULE  ~208

PREDICT POD RESOURCE USAGE SUB-MODULE    ~210

DYNAMICALLY ADJUST POD RESOURCE
LIMIT(S) SUB-MODULE                      ~212

PROPAGE DYNAMIC ADJUSTMENT OF POD
RESOURCE LIMIT(S) SUB-MODULE             ~214

FIG. 2

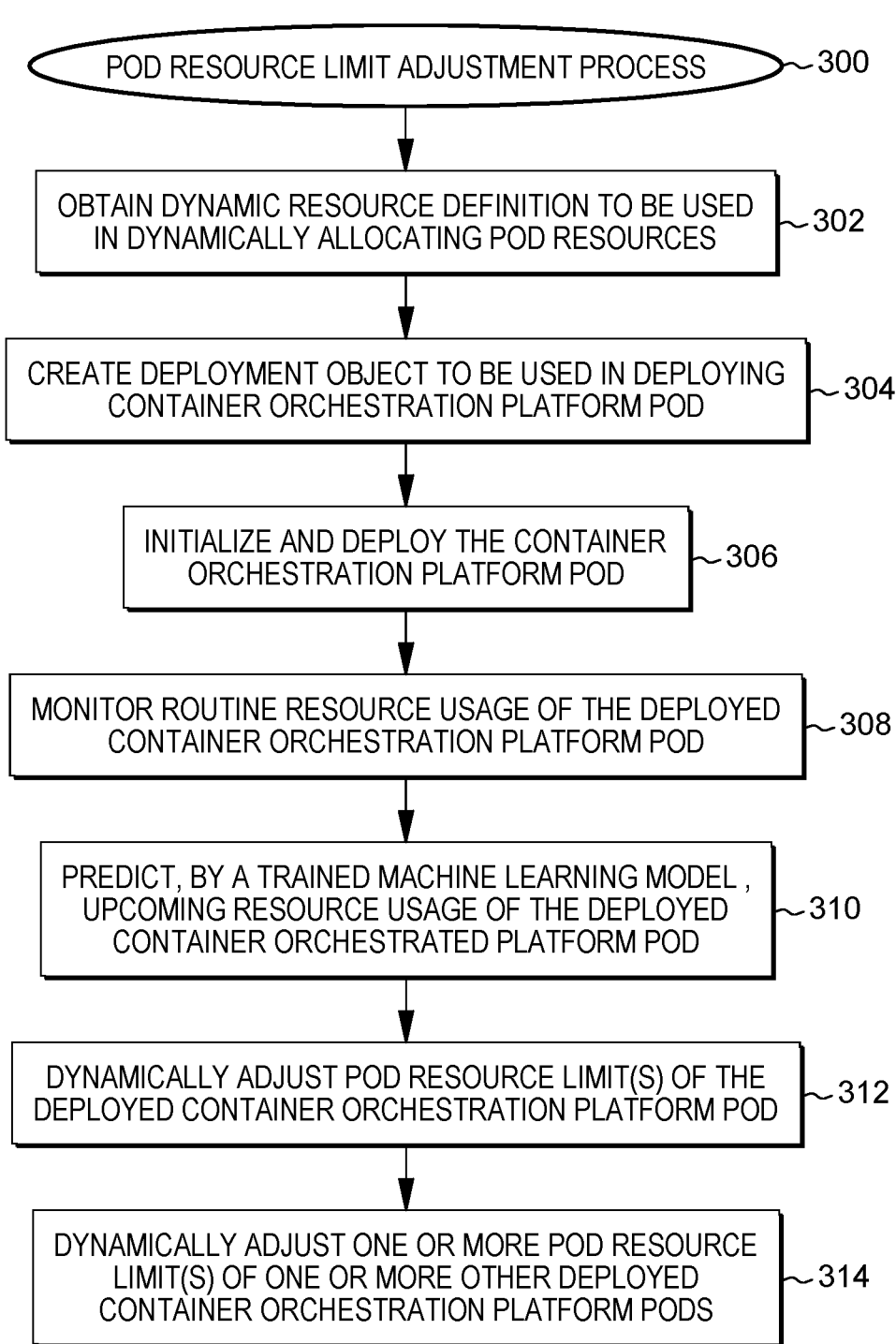

POD RESOURCE LIMIT ADJUSTMENT PROCESS — 300

OBTAIN DYNAMIC RESOURCE DEFINITION TO BE USED IN DYNAMICALLY ALLOCATING POD RESOURCES — 302

CREATE DEPLOYMENT OBJECT TO BE USED IN DEPLOYING CONTAINER ORCHESTRATION PLATFORM POD — 304

INITIALIZE AND DEPLOY THE CONTAINER ORCHESTRATION PLATFORM POD — 306

MONITOR ROUTINE RESOURCE USAGE OF THE DEPLOYED CONTAINER ORCHESTRATION PLATFORM POD — 308

PREDICT, BY A TRAINED MACHINE LEARNING MODEL , UPCOMING RESOURCE USAGE OF THE DEPLOYED CONTAINER ORCHESTRATED PLATFORM POD — 310

DYNAMICALLY ADJUST POD RESOURCE LIMIT(S) OF THE DEPLOYED CONTAINER ORCHESTRATION PLATFORM POD — 312

DYNAMICALLY ADJUST ONE OR MORE POD RESOURCE LIMIT(S) OF ONE OR MORE OTHER DEPLOYED CONTAINER ORCHESTRATION PLATFORM PODS — 314

FIG. 3

Example: Avg(last(30days)) or 100Mi

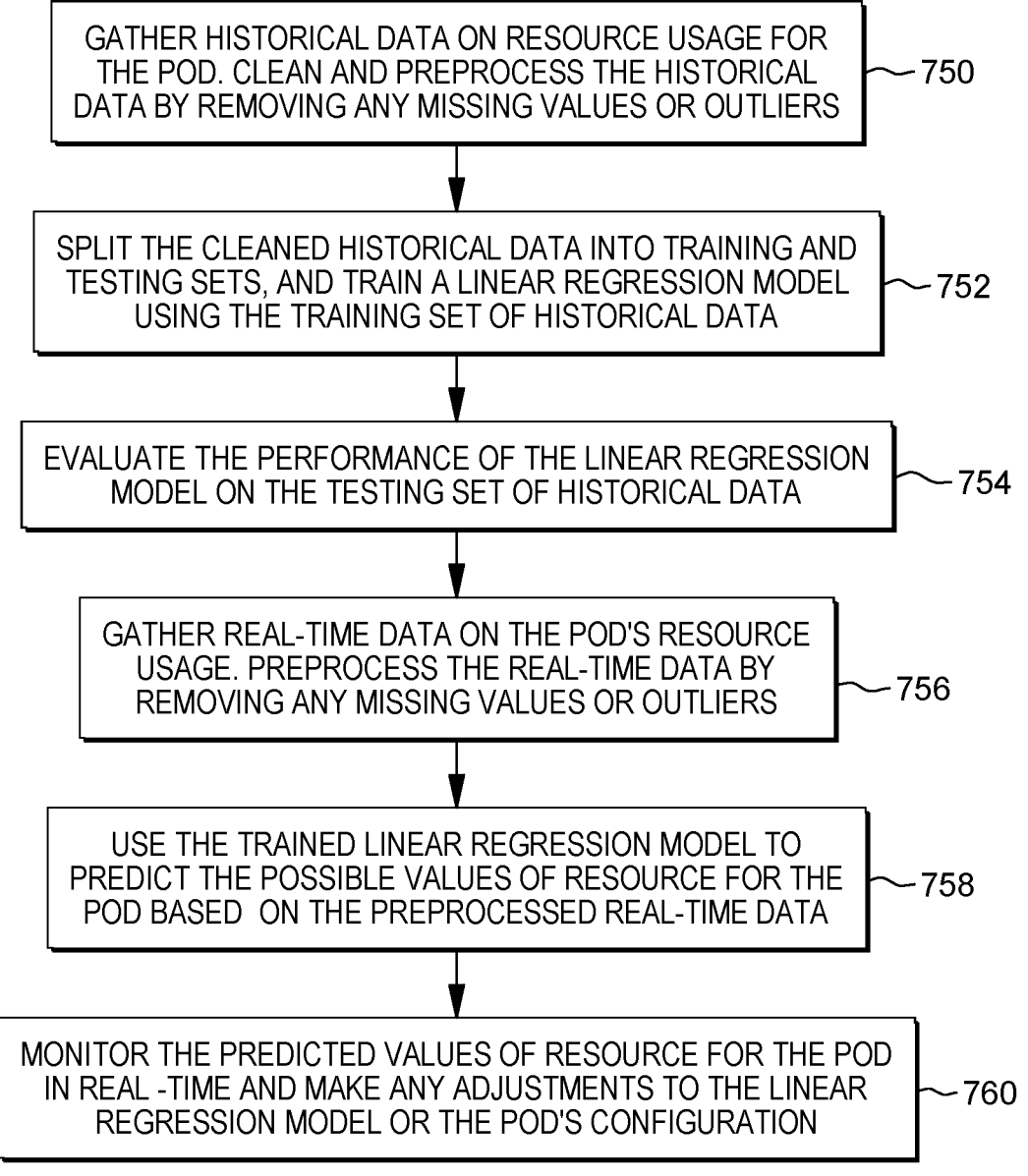

GATHER HISTORICAL DATA ON RESOURCE USAGE FOR THE POD. CLEAN AND PREPROCESS THE HISTORICAL DATA BY REMOVING ANY MISSING VALUES OR OUTLIERS ~750

SPLIT THE CLEANED HISTORICAL DATA INTO TRAINING AND TESTING SETS, AND TRAIN A LINEAR REGRESSION MODEL USING THE TRAINING SET OF HISTORICAL DATA ~752

EVALUATE THE PERFORMANCE OF THE LINEAR REGRESSION MODEL ON THE TESTING SET OF HISTORICAL DATA ~754

GATHER REAL-TIME DATA ON THE POD'S RESOURCE USAGE. PREPROCESS THE REAL-TIME DATA BY REMOVING ANY MISSING VALUES OR OUTLIERS ~756

USE THE TRAINED LINEAR REGRESSION MODEL TO PREDICT THE POSSIBLE VALUES OF RESOURCE FOR THE POD BASED ON THE PREPROCESSED REAL-TIME DATA ~758

MONITOR THE PREDICTED VALUES OF RESOURCE FOR THE POD IN REAL -TIME AND MAKE ANY ADJUSTMENTS TO THE LINEAR REGRESSION MODEL OR THE POD'S CONFIGURATION ~760

FIG. 7C

DYNAMIC POD RESOURCE LIMIT ADJUSTING BASED ON DATA ANALYTICS

BACKGROUND

One or more aspects relate, in general, to facilitating processing within a computing environment, and in particular, to dynamically adjusting, at runtime, pod resource limits of container orchestration platform pods in the computing environment.

Container orchestration platforms and/or tools provide a framework for managing containers and microservice architectures at scale. Container orchestration automates the development, management, scaling, and networking of containers, and can be used with enterprises that need to deploy and manage hundreds or even thousands of containers.

A container provides a microservice-based application with an application deployment unit and self-contained execution environment. Containers make it possible to run multiple parts of an application independently as microservices, on the same hardware, with greater control over individual application components and life cycles.

A container orchestration platform typically supports a cluster, control plane, agent, and one or more pods. A cluster is a control plane and one or more compute machines, or nodes. The control plane is a collection of processes that control container orchestration platform nodes, and is the location where task assignments originate. The agent is a service that runs on the nodes and reads the container manifest, and ensures the defined containers are started and running. A pod is a group of one or more containers deployed to a single node. The containers in a pod share an IP address, IPC, host name, and other resources.

SUMMARY

Certain shortcomings of the prior art are overcome, and additional advantages are provided herein through the provision of a computer-implemented method of facilitating processing within a computing environment. The computer-implemented method includes: deploying a container orchestration platform pod with one or more pod resources in the computing environment. The pod resources have associated therewith one or more pod resource limits. Further, the computer-implemented method includes monitoring a runtime resource usage of the container orchestration platform pod and predicting, by a trained machine learning model, upcoming resource usage of the container orchestration platform pod, the predicting using, at least in part, the monitored runtime resource usage. In addition, the computer-implemented method includes dynamically adjusting a pod resource limit of the one or more pod resource limits of the container orchestration platform pod in the computing environment. The dynamically adjusting is based on the monitored runtime resource usage, and the predicted upcoming resource usage. Advantageously, processing is facilitated within a container architecture-based computing environment by providing enhanced use of resources. By dynamically adjusting pod resource limits, cost efficient usage of computing resources is provided, along with effective and dynamic utilization of resources, which supports on-demand resource allocation without unnecessary waste of resources. Further, the process saves costs, lowers carbon footprint, and reduces energy consumption by more efficiently using computing resources in a container-based computing environment.

In one implementation, the computer-implemented method further includes obtaining the trained machine learning model by training a machine learning model on historical resource usage data of the container orchestration platform pod. Further, in one embodiment, the computer-implemented method further includes using the predicted upcoming resource usage of the container orchestration platform pod in continuing training of the trained machine learning model. In one example, the machine learning model includes a linear regression model. Advantageously, predicting, using the trained machine learning model, upcoming resource usage of the container orchestration platform pod, facilitates the dynamically adjusting of the pod resource limit of the container orchestration platform pod to provide, for instance, cost efficient usage of computing resources, and effective and dynamic utilization of resources, and to support on-demand resource allocation without waste of resources.

In one implementation, the deploying includes initializing and deploying the container orchestration platform pod. The initialing and deploying includes, for instance, obtaining a dynamic resource definition to be used in dynamically allocating pod resources for the container orchestration platform pod being deployed. The dynamic resource definition includes a resource usage formula. Further, the initializing and deploying includes creating a deployment object to be used in deploying the container orchestration platform pod. In one embodiment, the creating includes parsing the resource usage formula of the dynamic resource definition, and generating, based on parsing the resource usage formula of the dynamic resource definition, one or more initial pod resource limits for use with initializing the container orchestration platform pod. Further, the initializing and deploying includes initialing and deploying the container orchestration platform pod with the one or more pod resources in the computing environment, the initializing applying the generated one or more initial pod resource limits to the deploying of the container orchestration platform pod with the one or more pod resources. Advantageously, generating the one or more initial pod resource limits for use with initializing the container orchestration platform pod based on the resource usage formula of the dynamic resource definition further enhances use of resources by, for instance, setting initial pod resource limits via the resource usage formula to efficiently initialize the container orchestration platform pod with the appropriate pod resource limits.

In one implementation, the monitored runtime resource usage includes runtime central processing unit usage of the container orchestration platform pod and runtime memory usage of the container orchestration platform pod. Advantageously, dynamically adjusting the pod resource limit based on runtime central processing unit (CPU) usage and runtime memory usage of the container orchestration platform pod more efficiently uses computing resources in the container-based computing environment, and thereby saves processing costs, lowers carbon footprint, and reduces energy consumption.

In one embodiment, the dynamically adjusting includes dynamically increasing during runtime the pod resource limit of the container orchestration platform pod in the computing environment. In another implementation, the dynamically adjusting includes dynamically decreasing during runtime the pod resource limit of the container orchestration platform pod in the computing environment. Advantageously, dynamically increasing and/or decreasing during runtime the pod resource limit of the container orchestration platform pod in the computing environment provides cost efficient usage of computing resources, as well as effective and dynamic utilization of resources, and supports on-demand resource allocation without allocating unnecessary resources.

In one implementation, the dynamically adjusting is further based on an auto-scaling mode of the container orchestration platform pod. In one example, where the auto-scaling mode is a post-intervention mode, the dynamically adjusting is further based on a number of instances of the container orchestration platform pod staying at a specified pod instance limit for a set period of time. In another example, where the auto-scaling mode is a first-in mode, the dynamically adjusting proceeds before auto-scaling of a number of instances of the container orchestration platform pod. Advantageously, dynamically adjusting of the pod resource limit based on the auto-scaling mode provides an ability to dynamically adjust pod resource limits, post-horizontal pod auto-scaling, or pre-horizontal pod auto-scaling. This further enhances effective and dynamic utilization of resources to, for instance, better balance processing of a load, and avoid inefficient system operation, such as slow running of the computing system.

In one implementation, the computer-implemented method further includes dynamically adjusting one or more pod resources of one or more other container orchestration platform pods in the computing environment based on the dynamically adjusting of the pod resource limit of the container orchestration platform pod. Advantageously, dynamically adjusting one or more pod resources or one or more other container orchestration platform pods in the computing environment based on the dynamic adjusting of the pod resource limit facilitates resource scalability within the computing environment by scaling-up and/or scaling-down resources across multiple container orchestration platform pods based on needs within the container-based computing environment. This facilitates processing within the container architecture-based computing environment, and enhances use of resources. Further, the dynamic utilization of resources across multiple container orchestration platform pods better balances processing of the load and enhances efficient operation of the container-based computing environment.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 1 depicts one example of a computing environment to include and/or use one or more aspects of the present invention;

FIG. 2 depicts one embodiment of a computer program product with a pod resource limit adjustment module, in accordance with one or more aspects of the present invention;

FIG. 3 depicts one embodiment of a pod resource limit adjustment process, in accordance with one or more aspects of the present invention;

FIG. 7C depicts a further example of a prediction workflow of the prediction component of FIG. 4, in accordance with one or more aspects of the present invention;

DETAILED DESCRIPTION

Figure 4:
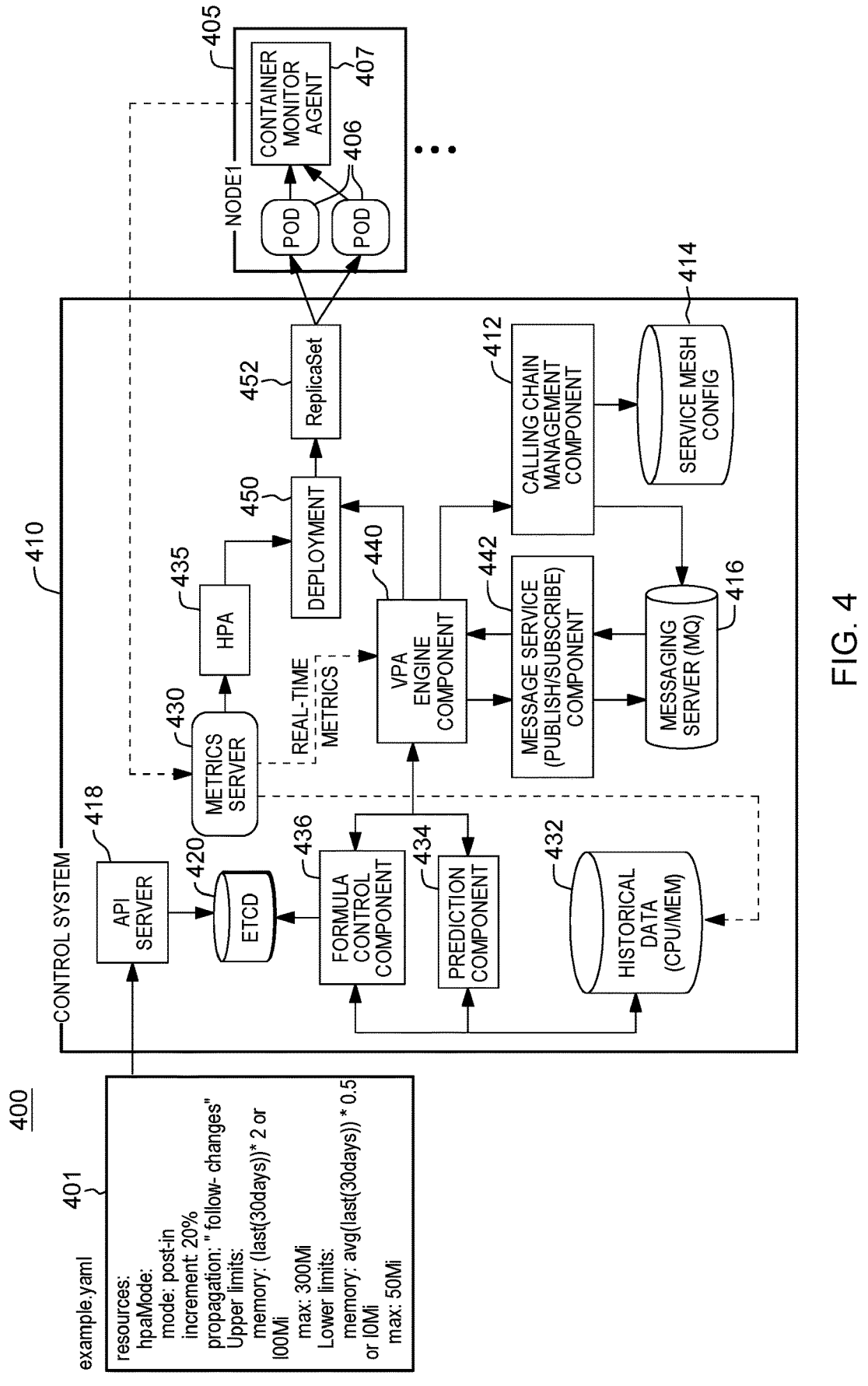
FIG. 4 depicts another example of a container-based computing environment to include and/or use one or more aspects of the present invention.

The accompanying figures, which are incorporated in and form a part of this specification, further illustrate the present invention and, together with this detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects or features are disclosed herein, and unless inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, or tools only as examples, and not by way of limitation. Furthermore, the illustrative embodiments are described in certain instances using particular software, hardware, tools, or data processing environments only as example for clarity of description. The illustrative embodiments can be used in conjunction with other comparable or similarly purposed structures, systems, applications, or architectures. One or more aspects of an illustrative embodiment can be implemented in software, hardware, or a combination thereof.

As understood by one skilled in the art, program code, as referred to in this application, can include software and/or hardware. For example, program code in certain embodiments of the present invention can utilize a software-based implementation of the functions described, while other embodiments can include fixed function hardware. Certain embodiments can combine both types of program code. Examples of program code, also referred to as one or more programs, are depicted in FIG. 1, including operating system 122 and pod resource limit adjustment module 200, which are stored in persistent storage 113.

One or more aspects of the present invention are incorporated in, performed and/or used by a computing environment. As examples, the computing environment can be of various architectures and of various types, including, but not limited to: personal computing, client-server, distributed, virtual, emulated, partitioned, non-partitioned, cloud-based, quantum, grid, time-sharing, clustered, peer-to-peer, mobile, having one node or multiple nodes, having one processor or multiple processors, and/or any other type of environment and/or configuration, etc., that is capable of executing a process (or multiple processes) that, e.g., perform pod resource limit adjustment processing, such as disclosed herein. Aspects of the present invention are not limited to a particular architecture or environment.

Prior to further describing detailed embodiments of the present invention, an example of a computing environment to include and/or use one or more aspects of the present invention is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as pod resource limit adjustment module block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 126 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. Further, in one or more embodiments, one or more of the components/modules of FIG. 1 need not be included in the computing environment and/or are not used for one or more aspects of the present invention. Further, in one or more embodiments, additional and/or other components/modules can be used. Other variations are possible.

As indicated, in one example, computing environment 100 supports containers. The containers can be provided in a cloud, such as a public cloud (e.g., public cloud 105), a private cloud (e.g., private cloud 106), a hybrid cloud and/or on-premises (e.g., computer 101). In one example, containers are managed by one or more container orchestration platforms. One example of such a platform is Kubernetes®, which an open-source, extensible, portable container management platform. Kubernetes is a registered trademark of the Linux Foundation, San Francisco, CA. Other platforms may also be used. In Kubernetes®, for example, a container has its own central processing unit share, filesystem, process space, memory, and more. Further, containers may share the operating system (OS) among applications due to their relaxed isolation properties; containers are decoupled from the underlying infrastructure; containers are portable across operating system distributions and clouds; and each container is repeatable. Containers are intended to be stateless and immutable-code of a running container is not to be changed; instead, a new container image is to be built to include any code change.

As noted, container orchestration platforms typically support, in part, one or more pods, with a pod being a group of one or more containers deployed to a single node. The containers in a pod typically share an IP address, IPC, host name, and other resources. In one example, a computing environment can employ a platform, such as Kubernetes® and/or another platform, to manage containers. Kubernetes® is a platform for running and managing containers from a plurality of container runtimes. The computing environment can include one or more nodes, an operating system shared by the one or more nodes, and underlying hardware, such as processing units, etc., used by the one or more nodes. The nodes can be virtual or physical machines, and they can be on-premise (e.g., in computer 101 and/or other computing devices) and/or in a cloud environment (e.g., public cloud 105, private cloud 106, a hybrid cloud environment, and/or other cloud environment). In one example, a node includes a container runtime; one or more pods; a proxy; and an agent. One example of a proxy is a kube-proxy, which is a network proxy that runs on each node in a cluster, implementing part of the Kubernetes® service concept. A kube-proxy maintains network rules on the nodes, and these network rules allow network communication to the pods from network sessions inside or outside of the cluster. One example of an agent is a kubelet that runs on each node. It can register the node, using one or more of a hostname, flag, or other indicator, with an application programming interface (API) server that validates and configures data for objects (e.g., pods). In other examples, in which the platform is other than Kubernetes®, the proxy and agent can be for that platform. Many examples are possible.

In one example, a container runtime interface is provided, which is a plug-in interface that enables the agent (e.g., the kubelet) to use a variety of container runtimes, without having to recompile the cluster components. Further, in one example, a pod includes one or more containers, and a container includes, for instance, a container image having one or more applications with one or more libraries, and/or one or more binary and/or text resources. A container image is deployed on the node.

For resource control of pods and containers, a developer is allowed to specify how much resources (e.g., memory, CPU, storage, etc.) are required for supporting the pod at runtime. For example, there are typically two different static settings of a pod resource control. These include a request, or lower limit, which defines how much of a resource is needed as a minimum requirement (i.e., lower limit), and a limit, which defines an upper limitation of the resource usage (i.e., upper limit). For instance, an exemplary pod specification might include:

```
apiVersion: v1
kind: Pod
metadata:
   name: frontend
spec:
   containers:
   - name: app
     image: images.my-company.example/app:v4
     resources:
        lower limits:
           memory: "64Mi"
           cpu: "250m"
        upper limits:
           memory: "128Mi"
           cpu: "500m"
```

Note in the above exemplary pod specification, Mi (Mebibytes) and m (milli) are Kubernetes® resource units. The container orchestration platform scheduler schedules the pods and/or container deployment based on the pod resource limit definitions, and the available resources on existing nodes. The specific resource limits for different resource types, such as memory and CPU, are typically different in practice.

Based on current specification, a deployer optionally provides specific values for the lower limits and upper limits for different resource types. Basically, these lower and upper limits are static values based on estimation of how much resource is required for pod deployment and runtime processing. A number of challenges exist with this approach. For instance, the deployer must understand the details of the application and existing infrastructure to perform an acceptable estimation, such as how much resource is available in a typical cluster node, and how much resource is remaining on the existing nodes. Further, after deployment, incoming work, or requests, for processing may not be predictable, making it hard to define a static value for the lower and upper pod resource limits. Conventionally, it is possible to scale the number of pods, but there is no solution to address the challenges with the lower and upper pod resource limits associated with the pods.

Addressing these challenges, one or more embodiments of a pod resource limit adjustment module and process are disclosed herein, and are described initially with reference to FIGS. 2-3. FIG. 2 depicts one embodiment of pod resource limit adjustment module 200 that includes code or instructions to perform pod resource limit adjustment processing, in accordance with one or more aspects of the present invention, and FIG. 3 depicts one embodiment of a pod resource limit adjustment process, in accordance with one or more aspects of the present invention.

Referring to FIGS. 1 & 2, pod resource limit adjustment module 200 includes, in one example, various sub-modules used to perform processing, in accordance with one or more aspects of the present invention. The sub-modules are, e.g., computer-readable program code (e.g., instructions) and computer-readable media (e.g., persistent storage (e.g., persistent storage 113, such as a disk) and/or a cache (e.g., cache 121), as examples). The computer-readable media can be part of a computer program product and can be executed by and/or using one or more computers, such as computer(s) 101; processors, such as a processor of processor set 110; and/or processing circuitry, such as processing circuitry of processor set 110, etc.

In the FIG. 2 embodiment, example sub-modules of pod resource limit adjustment module 200 include, for instance: an obtain dynamic resource definition sub-module 202 to obtain a dynamic resource definition to be used in dynamically allocating pod resources for a container orchestration platform pod to be deployed, where the dynamic resource definition includes a resource usage formula; a create deployment object sub-module 204 to create a deployment object to be used in deploying the container orchestration platform pod; an initialize and deploy container orchestration platform pod sub-module 206 for deploying the container orchestration platform pod with one or more pod resources in the computing environment, where the initializing applies the generated one or more pod resource limits; a monitor runtime resource usage sub-module 208 to monitor a runtime resource usage of the container orchestration platform pod; a predict pod resource usage sub-module 210 to predict, by a trained machine learning model, upcoming resource usage of the container orchestration platform pod, where the predicting uses, at least in part, the monitored runtime resource usage; a dynamically adjust pod resource limit(s) sub-module 212 to be used in dynamically adjusting a pod resource limit of the one or more pod resource limits for the container orchestration platform pod in the computing environment; and a propagate dynamic adjustment of pod resource limit(s) sub-module 214 to be used in dynamically adjusting one or more other pod resource limits for one or more other container orchestration platform pods in the computing environment based on the dynamically adjusting of the pod resource limit of the container orchestration platform pod. Advantageously, processing is facilitated within a container-architecture-based computing environment by providing enhanced use of resources. By dynamically adjusting pod resource limits, cost-effective usage of computing resources is provided, along with effective and dynamic utilization of resources, which supports on-demand resource allocation without unnecessary waste of resources. Further, the process disclosed saves costs, lowers carbon footprint, and reduces energy consumption by more efficiently using computing resources in the container-based computing environment. Note that although various sub-modules are described, pod resource limit adjustment module processing such as disclosed herein can use, or include, additional, fewer, and/or different sub-modules. A particular sub-module can include additional code, including code of other sub-modules, or less code. Further, additional and/or other modules can be used. Many variations are possible.

In one or more embodiments, the sub-modules are used, in accordance with one or more aspects of the present invention, to perform pod resource limit adjustment processing. FIG. 3 depicts one example of a pod resource limit adjustment process, such as disclosed herein. The process is executed, in one or more examples, by a computer (e.g., computer 101 (FIG. 1)), and/or a processor or processing circuitry (e.g., of processor set 110 of FIG. 1). In one example, code or instructions implementing the process, are part of a module, such as pod resource limit adjustment module 200. In other examples, the code can be included in one or more other modules and/or in one or more sub-modules of the one or more other modules. Various options are available.

As one example, pod resource limit adjustment process 300 executing on a computer (e.g., computer 101 of FIG. 1), a processor (e.g., a processor of processor set 110 of FIG. 1), and/or processing circuitry (e.g., processing circuitry of processor set 110), obtains a dynamic resource definition to be used in dynamically allocating pod resources for a container orchestration platform pod to be deployed 302, where the dynamic resource definition includes a resource usage formula. The pod resource limit adjustment process 300 further includes creating a deployment object to be used in deploying the container orchestration platform pod 304. In one embodiment, creating the deployment object can include, for instance, parsing the resource usage formula of the dynamic resource definition, and generating, based on parsing the resource usage formula of the dynamic resource definition, one or more pod resource limits for use with initializing the container orchestration platform pod.

In one embodiment, pod resource limit adjustment process 300 further includes initializing and deploying the container orchestration platform pod with one or more pod resources in the computing environment 306. The initializing can include applying the generated one or more pod resource limits.

Further, the pod resource limit adjustment process 300 includes, in one embodiment, monitoring a runtime resource usage of the container orchestration platform pod 308, and predicting, by a trained machine learning model, upcoming resource usage of the container orchestration platform pod 310. In one example, the predicting can be, for instance, for a defined time interval, such as predicting upcoming resource usage requirements in the next x seconds, or y minutes.

In addition, in one embodiment, the pod resource limit adjustment process 300 includes dynamically adjusting a pod resource limit of the one or more pod resource limits for the container orchestration platform pod in the computing environment 312. In one embodiment, the dynamically adjusting is based on the monitored runtime resource usage, and the predicted upcoming resource usage. Further, in one embodiment, pod resource limit adjustment process 300 can include selectively propagating one or more dynamic adjust-ments of pod resource limits to one or more other container orchestration platform pods 314. For instance, the process can include dynamically adjusting one or more other pod resource limits of one or more other container orchestration platform pods in the computing environment based on the dynamically adjusting of the pod resource limit of the container orchestration platform pod.

In another computing environment example, FIG. 4 depicts a container-based architecture computing environ-ment 400, which (in one embodiment) can reside within, or be similar to, computing environment 100 described above in connection with FIG. 1. Computing environment 400 includes a control system 410 with program code configured to implement one or more aspects of a container orchestra-tion platform, as well as one or more aspects of a pod resource limit adjustment facility, such as disclosed herein. In addition, computing environment 400 includes one or more nodes 405, as well as underlying hardware, such as processing units, etc., used by control system 410 and one or more nodes 405. The nodes may be virtual or physical machines, and they may be on-premise (e.g., in computer 101 (FIG. 1)), and/or other computer device(s), and/or in a cloud environment (e.g., public cloud 105, private cloud 106, a hybrid cloud environment and/or other cloud envi-ronment). In one example, computing environment 400 employs a platform, such as Kubernetes®, and/or other platform, to manage the pods and containers, and further includes components and/or features in accordance with one or more aspects of the present invention.

By way of example, control system 410 includes a calling chain management component 412, which in one embodi-ment, includes a service message configuration reader (SMCR) to automatically create channels and subscriptions based on SMCR. Further, calling chain management com-ponent 412 is configured, in one embodiment, to customize which service change events are subscribed to by the dif-ferent pods. In addition, control system 410 includes a service mesh configuration datastore 414, and a messaging server (MQ) 416, which facilitates a subscriber taking action when an event is received, and a publisher taking action when a change occurs, that is, to send a change event to a channel. An application programming interface (API) server 418 of control system 410 receives configuration of an application 401, which can include a dynamic resource definition to be used in dynamically allocating pod resources for the container orchestration platform pod being deployed, in accordance with one or more aspects of the present invention. In one or more aspects, the dynamic resource definition includes a resource usage formula, which facili-tates, for instance, the dynamic adjusting of pod resource limits of one or more container orchestration platform pods. Note that the configuration can be saved to a database 420. In one example, database 420 can be an etcd store, which is an open storage distributed key-value store used to hold and manage information for distributed systems, and in particu-lar, can manage configuration data, state data, and metadata for Kubernetes®.

A metrics server 430 obtains runtime resource usage data for pods 406 and/or containers of the pods via a container monitor agent 407 associated with the one or more nodes 405 having one or more pods 406. The runtime resource usage data is forwarded by metrics server 430 to an histori-cal data database 432. In one or more embodiments, the runtime resource usage data can include runtime data on central processing unit (CPU) usage, memory usage, etc., for the pods and/or containers running on the nodes. The historical data can be referenced by a prediction component 434, which is configured to collect historical resource usage data and current runtime usage data as input for use in predicting, by a trained machine learning model, upcoming resource usage of one or more container orchestration plat-form pods running on the nodes. In one implementation, prediction component 434 predicts incoming request traffic according to collected resource usage data. A formula con-trol component 436, or formula manager, accesses the received configuration information from datastore 420, and the historical usage data from historical data database 432. In one or more embodiments, formula control component 436 is used to register formulas and formula handlers, and determines when resources (i.e., resource limits) are set through formulas, and if so, parses the syntax of the received configuration formulas. In one implementation, the formula can be parsed at runtime, and the handler of the formula in the formula datastore 420 can be found, and a call made to the handler to get the configuration value. The process is repeated until all formulas are parsed and respective values based on the formulas are determined.

A vertical pod auto-scale (VPA) engine component 440 communicates with prediction component 434 and formula control component 436 to, for instance, facilitate dynamic adjusting of a pod resource limit of one or more pod resource limits of a container orchestration platform pod in the computing environment, where the dynamically adjusting is based on monitored runtime resource usage, and the predicted upcoming resource usage. In one implementation, the VPA engine component 440 communicates with a message service component 442 to facilitate sending and receiving events to, for instance, propagate a pod resource limit change to one or more other container orchestration platform pods, such as discussed herein. In addition, VPA engine component 440 deploys any adjustments to a pod resource limit via a deployment component 450 and, in one embodiment, a replica set component 452. In one embodiment, deployment component 450 is further in communication with a horizontal pod auto-scaler (HPA) component 435. In one or more implementations, the vertical pod auto-scaler engine component 440 works with the horizontal pod auto-scaler component 435 and, for instance, in a post-intervention mode, proceeds with dynamic adjustment of the pod resource limit further based on a number of instances of the container orchestration platform pod staying at a specified pod instance limit for a set period of time. Alternatively, where the auto-scaling mode is a first-in mode, the dynamically adjusting proceeds before auto-scaling of the number of instances of the container orchestration platform pod. For instance, in this mode, the dynamic pod resource limit settings are applied first, and the horizontal pod auto-scaler is not applied until it is detected that the pod resource limit does not change significantly for a period of time. Note in this regard that, the horizontal pod auto-scaler initiates and deploys additional container orchestration platform pod instances in the computing environment, and the vertical pod auto-scaling engine component controls dynamically adjusting one or more pod resource limits of one or more container orchestration platform pods in the computing environment, in accordance with one or more aspects disclosed herein.

Figure 5:
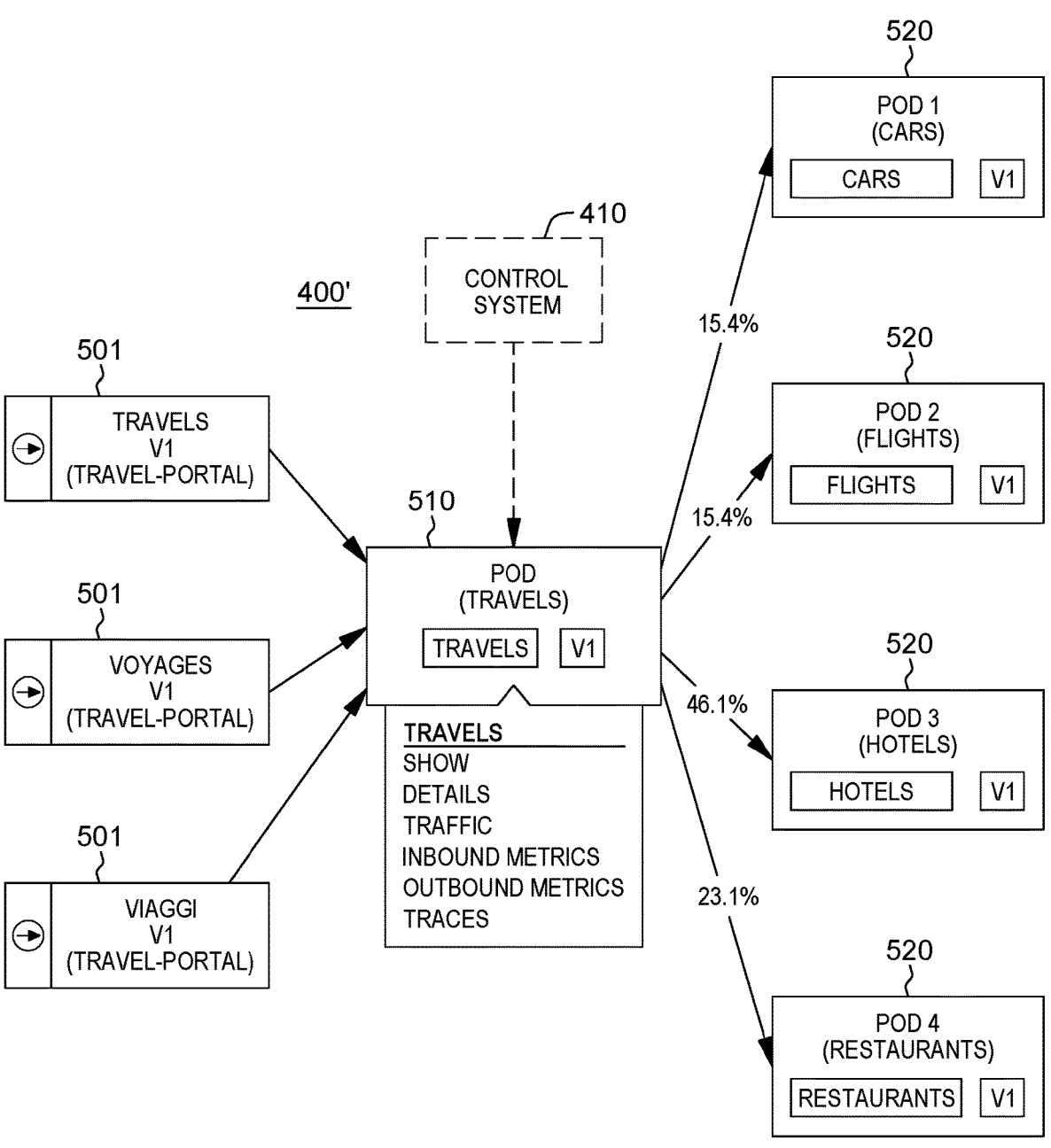
FIG. 5 depicts one example of a service mesh of a container-based computing environment to include pod resource limit adjusting, in accordance with one or more aspects of the present invention.

By way of example, FIG. 5 illustrates one embodiment of how pod resource limit adjustment processing such as disclosed herein can occur. Assume that there are multiple services deployed, including a service running on a pod 510 of a container-based architecture computing environment 400', such as computing environments 100 and 400 described above in connection with FIGS. 1 & 4. The container-based architecture computing environment 400' includes a control system 410, such as described above in connection with FIG. 4, and multiple pods 510, 520, running on one or more nodes of the computing environment. In this example, pod 510 provides, for instance, a first service, such as a travel-related service, and the first service invokes one or more second services, such as second services running on multiple other container orchestration platform pods 520. In the example, the travel service 510 can receive requests 501, and as part of processing the requests, access one or more other services running on one or more other pods related to the travel service being provided. Where the first service requires high runtime resource usage, the VPA engine component 440 of FIG. 4 can automatically scale-up one or more pod resource limits for, for instance, pod 510 to facilitate processing the high volume of requests, and based on the calling chain management component 412 (FIG. 4), one or more other container orchestration platform pods 520 supporting, at least in part, container orchestration platform pod 510, can also have one or more pod resource limits scaled-up, in one example.

In one or more implementations, processing within a container-based computing environment is facilitated, in accordance with one or more aspects disclosed herein, in three different phases. Phase 1 is a preparation phase, where processing initializes all required settings and configuration deployments, message queues, and sets up monitoring to collect resource usage data for saving as historical data. Phase 2 is a resource determination and/or prediction phase, where VPA engine dynamically adjusts resource usage limitations based on inputs from the formula control component, prediction component, propagated events from the message service, and/or real-time metrics at runtime. Phase 3 includes VPA engine result propagation, where the VPA engine propagates a resource limit adjustment event to subsequent services, such as second services running on multiple other container orchestration platform pods (e.g., pods 520 in the example of FIG. 5). In this manner, the resource usage limits of the secondary services will also be dynamically adjusted, facilitating on-demand resource allocation across pod levels.

Referring to FIG. 4, in one embodiment, preparation phase 1 includes calling chain management component 412 regularly synchronizing the calling chain microservices based on the service mesh configuration 414. The calling chain management component 412 establishes the message queue (MQ) based on the calling chain information. In one embodiment, an end user, or end user system, provides a dynamic resource definition, such as example.yaml 401 of FIG. 4, for facilitating deployment of resources, with the definition being based on one or more formulas that are saved to the definition datastore 420 (or formula registry).

Formula control component 436 parses the applicable formula, and in one implementation, can maintain a cache for each deployment. In one embodiment, formula control component 436 includes a syntax parser, a semantics analysis component, a formula handler, the formula registry, and a formula optimization component. In one or more implementations, the syntax parser can include basic syntax checking, to ensure that an input is in a valid format, and can create a syntax tree from the input. The semantics analysis component can be a runtime component to perform semantics analysis, identifying and extracting formulas, such as max(avg(30 day), avg(2 weeks)), and look up the corresponding handler in the formula registry. The formula handler includes built-in handlers and user-defined handlers that facilitate determining the result of a formula entered, for instance, by the system user. The formula register can manage the registration of formulas, and allow users to customize formulas in the handler. In one embodiment, the formula registry can be part of the definition datastore 420. The formula optimization component can be based on the Compilers Principle to do formula optimization. For instance, max(avg(30 days), avg(30 days)) could be optimized as avg(30 days). When creating a deployment object, the formula control component parses the dynamic resource definition for the pod, and generates one or more initial pod resource limits for pod initialization and deployment. One embodiment of a formula control component workflow 600 is depicted in FIG. 6.

Figure 6:
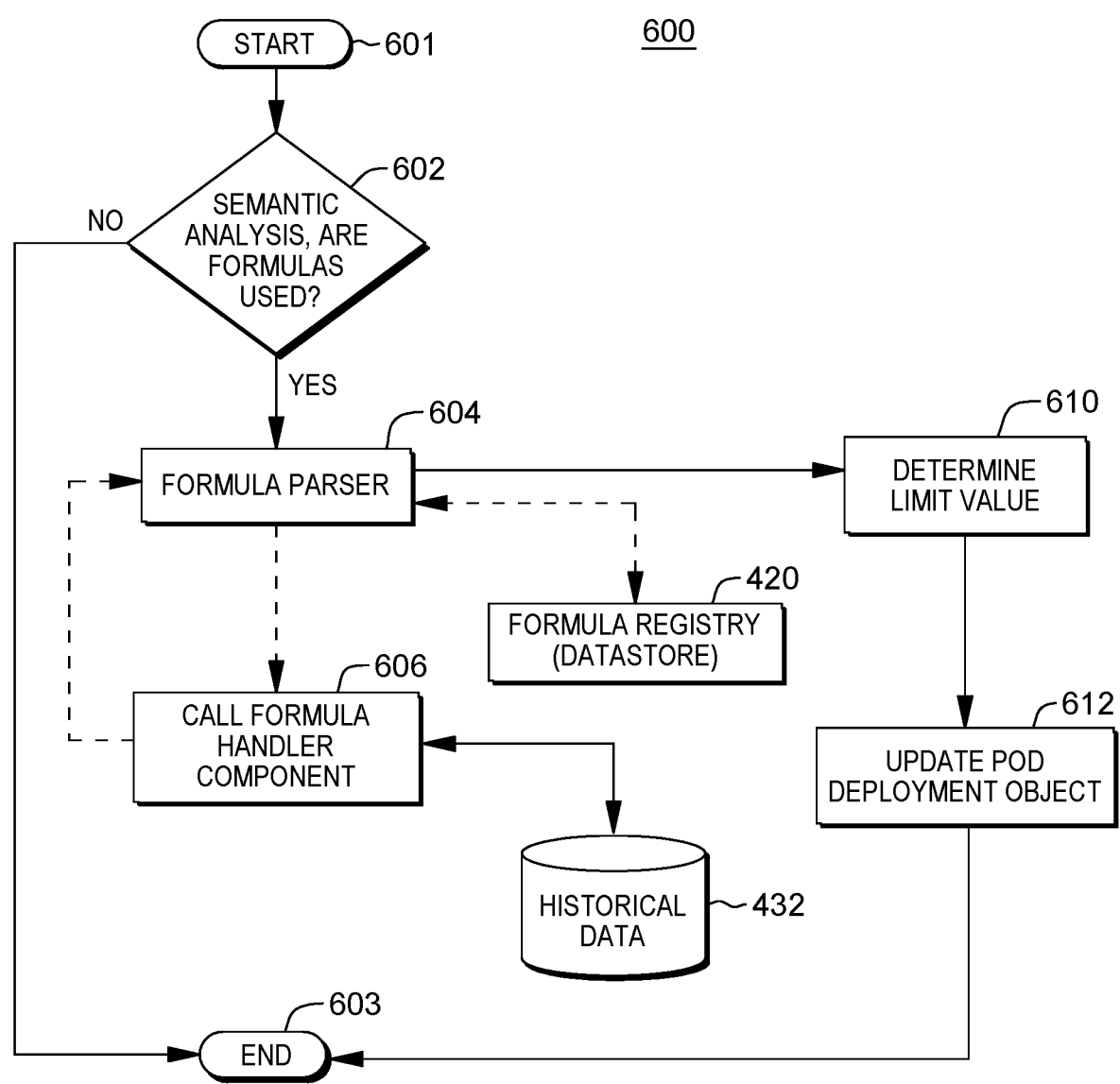
FIG. 6 depicts one example of a workflow of the formula control component of the control system of FIG. 4, in accordance with one or more aspects of the present invention.

Referring to FIG. 6, it is assumed herein that the dynamic resource definition includes a resource usage formula, such as avg(last(30 days)) or 100 Mi, as an example. This is an example formula that can be used for initialization. The formula is an expression consisting of multiple functions and operations. In the embodiment of FIG. 6, the workflow starts 601 with semantic analysis of the resource definition received at the control system for determining whether any formulas are used 602. If "no", then processing ends 603. Assuming that the resource definition includes a formula, then processing parses the formula 604, which can include calling the formula handler component 606 to facilitate parsing the formula. The formula can be obtained, for instance, from the formula registry or datastore 420, and the formula handler component can reference historical data 432 to obtain data needed to determine one or more limit values 610 using the formula. Once a limit value is determined, the pod deployment object 612 can be updated with the determined initial pod resource limit(s). In one or more embodiments, the formula control component can perform the steps of referencing the formula datastore, parsing the formula, and calling the formula handler, multiple times, in order to fully parse the particular formula. For instance, with the above-noted resource definition example, the formula control component first performs these steps for the "last" term, then performs the steps for the "avg" term. Depending on the formula, a series of operations can then be applied, if needed, to obtain the expression value for the formula. Note in the case of initialization, if the historical data is insufficient, the default value can be specified by the formula control component. For instance, with the noted resource definition, 100 Mi can be used as the initial value of the pod resource limit where there is insufficient resource usage data to dynamically determine the limit value.

Upon deployment, the metrics server 430 (FIG. 4) facilitates monitoring the real-time resource usage of the deployed pods or objects, and maintains a historical datastore 432. For runtime metrics, such as central processing unit (CPU) usage and/or memory usage by the container orchestration platform pod.

In Phase 2 processing, actual resource usage is determined, and upcoming resource usage is predicted. For instance, during runtime, formula control component 436 interfaces with the VPA engine component to provide historical values for deployed resource usage in order to determine dynamic resource usage limitations. For instance, in one example, the dynamic resource definition of an application configuration 401 might be as specified in FIG. 4. In the example configuration, the resource usage formula avg(last(30 days))×2 can be used to facilitate dynamically adjusting the pod resource limit(s) of the container orchestration platform pod. Note that in this configuration and formula example, pod resource usage is determined at runtime from historical data since the formula contains a last function (last(30 days)), which means to use data from the last 30 days, in one example only.

The prediction component 434 periodically monitors the historical resource usage data, and predicts upcoming resource usage of the container orchestration platform pod using, at least in part, the monitored runtime resource usage. Depending on the predicted upcoming resource usage, a prediction alert can be generated (e.g., where the predicted usage exceeds a threshold) and provided to the VPA engine component.

Figure 7A:
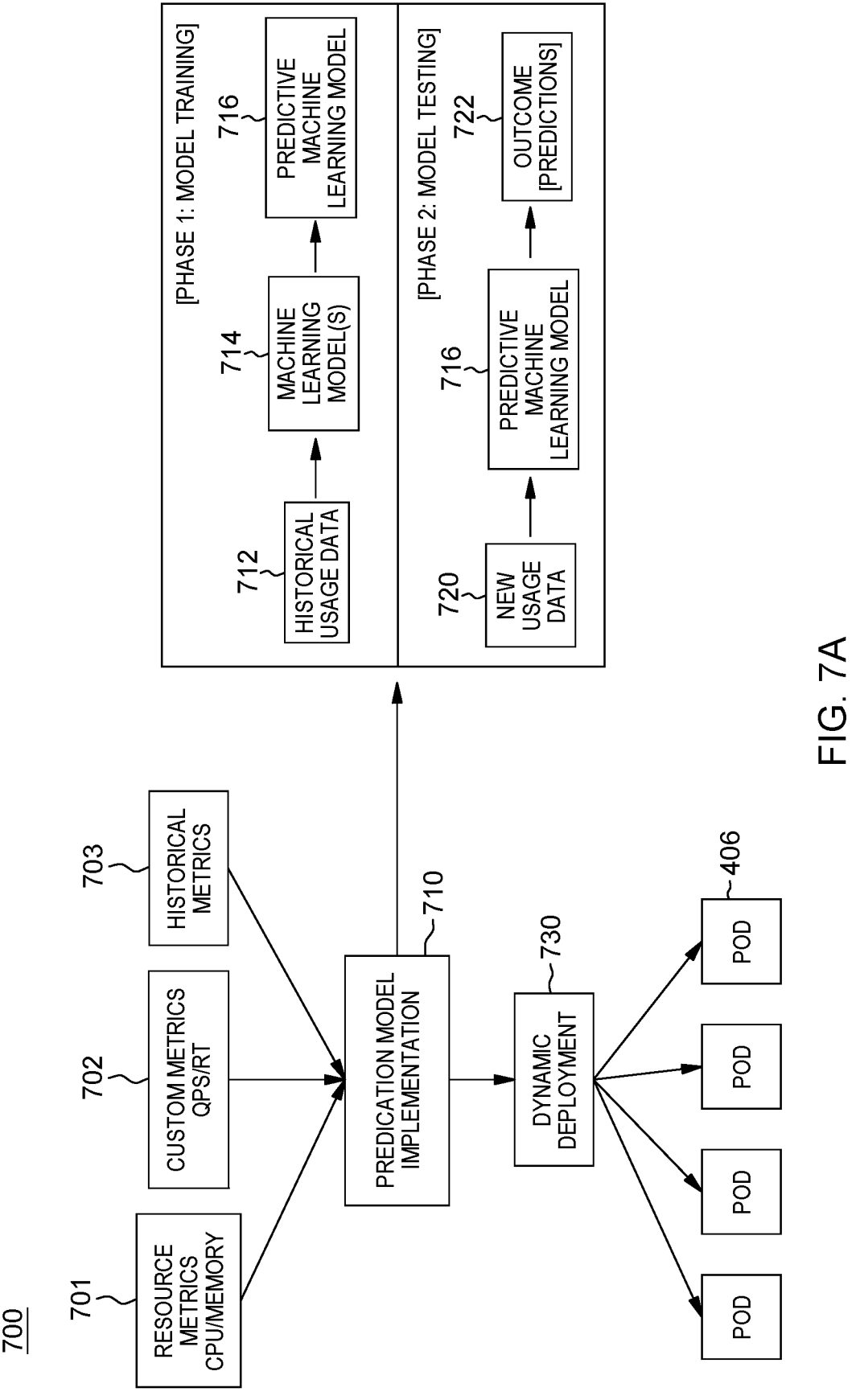
FIG. 7A depicts one embodiment of a workflow of the prediction component of the control system of FIG. 4, in accordance with one or more aspects of the present invention.
Figure 7B:
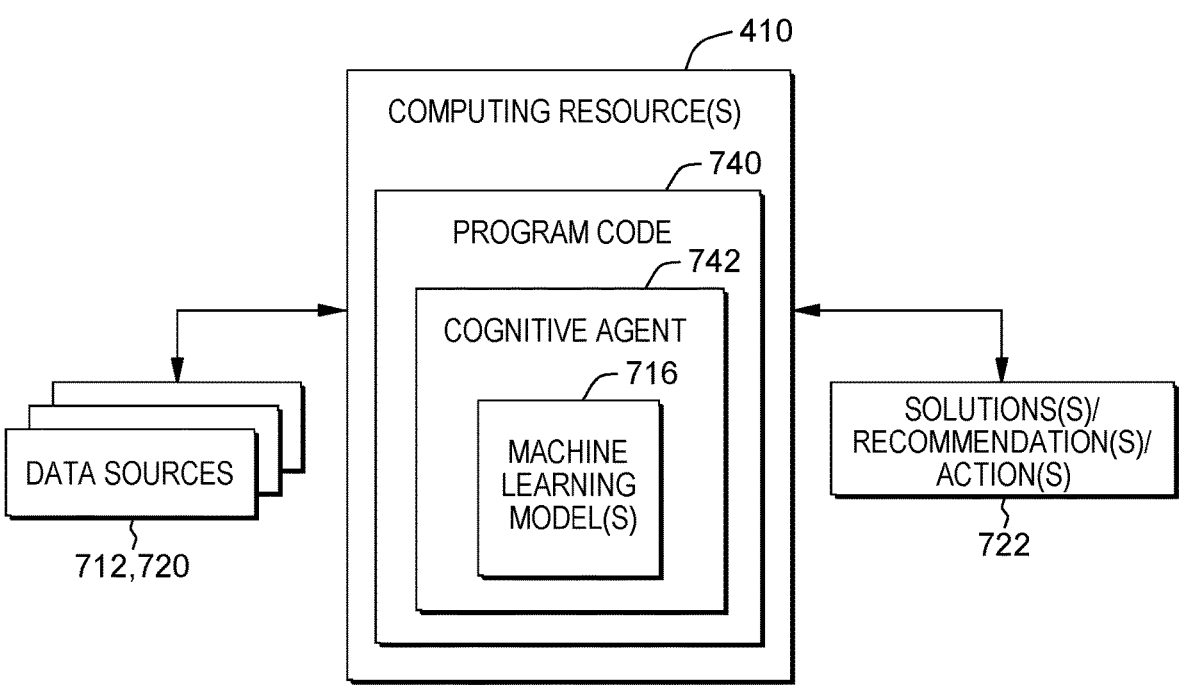
FIG. 7B depicts another example of a computing environment to include and/or use one or more aspects of the present invention.

FIGS. 7A-7C depict one embodiment of workflows and environments associated with prediction component 434 and VPA engine component 440. In FIG. 7A, a container-based computing environment 700, such as container-based computing environment 400 of FIG. 4, is illustrated, where a prediction model implementation 710 includes both a model training phase and a model testing phase, in one embodiment. As illustrated, prediction model implementation component 710 receives resource metrics 701, such as CPU and/or memory usage, any custom metrics 702, such as query per second/response time (QPS/RT), and historical data usage metrics 703. In the model training phase, historical resource usage data 712 is input to one or more machine learning models 714, which facilitate training a predictive machine learning model 716 to predict upcoming resource usage of a container orchestration platform pod, such as discussed herein. In the model testing phase, new runtime resource usage data 720 is applied to the trained, predictive machine learning model 716 to generate one or more predictions 722, which can be the basis for one or more actions, such as adjusting dynamically a pod resource limit of one or more pod resource limits of a container orchestration platform pod. As illustrated in FIG. 7, the predicted upcoming resource usage can be applied, for instance, to the VPA engine component 440 of control system 410 of FIG. 4, to facilitate dynamic deployment 450 of one or more pod resource limit adjustments, with the one or more pod resource limit adjustments being propagated to one or more pods 406 of the container-based computing environment.

By way of further explanation, FIG. 7B depicts one embodiment of a computing environment, which can incorporate, or implement, one or more aspects of an embodiment of the present invention. In one or more implementations, control system 410 can be implemented as part of the computing environment, such as computing environment 100 described above in connection with FIG. 1. Control system 410 includes, and/or utilizes, one or more computing resources that execute program code 740 that implements, for instance, one or more aspects of a module or facility such as disclosed herein, and which includes a cognitive engine or agent 742, which trains and/or utilizes one or more machine learning models 716, such as described herein. Data, such as historical resource usage data, runtime resource usage data, or other data associated with generating a prediction model for dynamic pod resource adjustment in accordance with one or more aspects disclosed herein, is obtained from data sources 712, 720, and is used by cognitive agent 742, to train model(s) 716 to (for instance) predict upcoming resource usage of a container orchestration platform pod, to facilitate dynamic adjusting of a pod resource limit of one or more pod resource limits of the container orchestration platform pod, and/or to take other related actions 722, etc., based on the particular application of the machine-learning model(s) to facilitate achieving the dynamic pod resource limit adjustment workflow disclosed. In implementation, control system 410 can include, or utilize, one or more networks for interfacing various aspects of the computing resource(s), as well as one or more data sources 712, 720 providing the data, and one or more components, systems, etc., receiving an output, action, etc., 722 of machine learning model(s) 716 to facilitate performance of one or more system operations. By way of example, the network(s) can be, for instance, a telecommunications network, a local-area network (LAN), a wide-area network (WAN), such as the Internet, or a combination thereof, and can include wired, wireless, fiber-optic connections, etc. The network(s) can include one or more wired and/or wireless networks that are capable of receiving and transmitting data, including training data for the machine-learning model, and an output solution, recommendation, action, of the machine-learning model(s), such as discussed herein.

In one or more implementations, the computing resource(s) house and/or execute program code 740 configured to perform methods in accordance with one or more aspects of the present invention. By way of example, the computing resource(s) can be a computing-system-implemented resource(s). Further, for illustrative purposes only, the computing resource(s) in FIG. 7B are depicted as being a single computing system. This is a non-limiting example of an implementation. In one or more other implementations, the computing resource(s), by which one or more aspects of processing, such as discussed herein can, at least in part, be implemented in multiple separate computing resources or systems, such as one or more computing systems of a cloud-hosting environment, by way of example. Note in this regard that, although described herein as part of control system 410 of container-based computing environment 400 of FIG. 4, that one or more aspects of machine learning model training and/or testing can be performed by a computing system separate from control system 410. Many variations are possible.

In one embodiment, program code 740 executes cognitive engine or agent 742 which includes and trains one or more models 716. The models can be trained using training data that can include a variety of types of data, depending on the model and the data sources. In one or more embodiments, program code 740 executing on the one or more computing resources applies one or more algorithms of cognitive agent 742 to generate and train the model(s), which the program code then utilizes to determine a value for, for instance, an upcoming resource usage of a container orchestration platform pod, with the predicting using, for instance, monitored runtime resource usage of the pod. The value can be used to dynamically adjust a pod resource limit of the one or more pod resource limits of a container orchestration platform pod in the computing environment, such as described herein. In an initialization or learning stage, program code 740 trains one or more machine learning models 716 using obtained training data that can include, in one or more embodiments, historical usage data, or other data to be used by the artificial intelligence system workflow to, for instance, generate a prediction of upcoming resource usage of the container orchestration platform pod, such as described herein.

In one or more embodiments, data used to train the model(s) can include a variety of types of data, such as heterogeneous data generated by one or more data sources and/or data stored in one or more databases accessible by, the computing resource(s). Program code, in embodiments of the present invention, can perform data analysis to generate data structures, including algorithms utilized by the program code to predict and/or perform an action. As known, machine-learning-based modeling solves problems that cannot be solved by numerical means alone. In one example, program code extracts features/attributes from training data, which can be stored in memory or one or more databases. The extracted features can be utilized to develop a predictor function, h(x), also referred to as a hypothesis, which the program code utilizes as a model. In identifying machine learning model(s) 716, various techniques can be used to select features (elements, patterns, attributes, etc.), including but not limited to, diffusion mapping, principal component analysis, recursive feature elimination (a brute force approach to selecting features), and/or a random forest, to select the attributes related to the particular model. Program code can utilize one or more algorithms to train the model(s) (e.g., the algorithms utilized by program code), including providing weights for conclusions, so that the program code can train any predictor or performance functions included in the model. The conclusions can be evaluated by a quality metric. By selecting a diverse set of training data, the program code trains the model to identify and weight various attributes (e.g., features, patterns) that correlate to enhanced performance of the model.

In one or more embodiments, program code, executing on one or more processors, utilizes an existing cognitive analysis tool or agent (now known or later developed) to tune the model, based on data obtained from one or more data sources. In one or more embodiments, the program code can interface with application programming interfaces to perform a cognitive analysis of obtained data. Specifically, in one or more embodiments, certain application programing interfaces include a cognitive agent (e.g., learning agent) that includes one or more programs, including, but not limited to, natural language classifiers, a retrieve-and-rank service that can surface the most relevant information from a collection of documents, concepts/visual insights, tradeoff analytics, document conversion, and/or relationship extraction. In an embodiment, one or more programs analyze the data obtained by the program code across various sources utilizing one or more of a natural language classifier, retrieve-and-rank application programming interfaces, and tradeoff analytics application programing interfaces.

In one or more embodiments of the present invention, the program code can utilize one or more neural networks to analyze training data and/or collected data to generate an operational machine-learning model. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where datasets are mutual and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision-making tools). In general, program code utilizing neural networks can model complex relationships between inputs and outputs and identified patterns in data. Because of the speed and efficiency of neural networks, especially when parsing multiple complex datasets, neural networks and deep learning provide solutions to many problems in multi-source processing, which program code, in embodiments of the present invention, can utilize in implementing a machine-learning model, such as described herein.

By way of further example, FIG. 7C depicts another embodiment of a prediction workflow of prediction component 434 of FIG. 4, in accordance with one or more aspects of the present invention. The workflow begins by gathering historical resource usage data for the container orchestration platform pod, and preprocesses and cleans the historical data by removing any missing values or outliers 750. For instance, based on the application specification 401 of FIG. 4, for central processing unit (CPU) usage, processing can reference the historical resource usage data for the past 30 days.

In the workflow of FIG. 7C, the cleaned historical resource usage data is split into a training dataset and testing dataset, and the training dataset is used in training the machine learning model (e.g., linear regression model) 752. For instance, processing can remove any rows with missing values or remove any values more than, for example, 3 standard deviations from the mean. In one embodiment, processing can split the historical usage data so that 70% is used for the training dataset, and 30% for the testing dataset to facilitate training the linear regression model, in one embodiment.

In the workflow of 7C, performance of the linear regression model is evaluated on the testing dataset of historical resource usage data 754. For instance, the R-squared value can be determined, which measures how well the model fits the data.

Processing gathers runtime, or real-time, data on the pod's resource usage, and preprocesses the real-time data by removing any missing values or outliers. For instance, in one embodiment, runtime data on the container orchestration platform pod's CPU usage is obtained. For example, in one embodiment, data can be collected every minute and stored. Further, any rows with missing values can be removed, and/or any values more than (for example) 3 standard deviations from the mean can be removed, in one embodiment.

The trained linear regression model (i.e., trained machine learning model) can then be used to predict possible upcoming values of resource usage of the pod based on the preprocessed real-time data 758. For instance, the trained machine learning model can be used to predict the values of memory and CPU usage for the next upcoming minute based on the current values of CPU usage. The predicted values of resource usage for the pod can be monitored in real-time, and adjustments can be made to the trained machine learning model (e.g., linear regression model) and/or to the pod's configuration, that is, to one or more pod resource limits of the container orchestration platform pod 760.

Continuing with the resource determination phase, the VPA engine component 440 of control system 410 in FIG. 4 receives results from both formula control component 436, and prediction component 434, and initiates any adjustment based on those results. For example, based on the results, the VPA engine component can initiate updating the definition of the deployment object, such as for the pod configuration limits. For instance, the VPA engine component can dynamically change the pod memory limit, for example, from 100 Mi to 150 Mi, where needed. The VPA engine component can also work with the horizontal pod auto-scaling component 435, in one or more embodiments, to dynamically control pod level resource usage, such as described herein.

In one or more implementations, should the VPA engine component receive any events from the prediction component 434 or the message service 442 component, it will retrieve real-time metrics data from the metrics server 430. In this event, the VPA engine component can check the auto-scaling mode, and if the current state requires intervention, can make a final decision to do a scale-up or scale-down a pod resource limit, and also notify the deployment component 450 to adjust the resource limits as appropriate.

As noted, in one or more embodiments, the third Phase includes vertical pod auto-scaler result propagation. Assume that the VPA engine component 440 decides to scale-up a pod resource limit for one service, service A, such as running on pod 510 of FIG. 5. After the resource is adjusted by the VPA engine component, the resource limit change can be sent to the message queue through the message service (publisher) 442 to notify the resource change at service A to other services, such as the second services on pods 520 in the example of FIG. 5.

The corresponding VPA engine component receives the message from the message service (subscriber) that the prior service, service A, has changed resource limits, and invokes calling chain management to find subsequent services, for instance, service B. In one embodiment, the VPA engine takes action to propagate the change using Phase 2 processing for service B, by calculating a new resource limit value for service B. If it requires the VPA engine component to intervene, the component notifies the deployment component to adjust one or more pod resource limits for service B as well.

Figure 8:
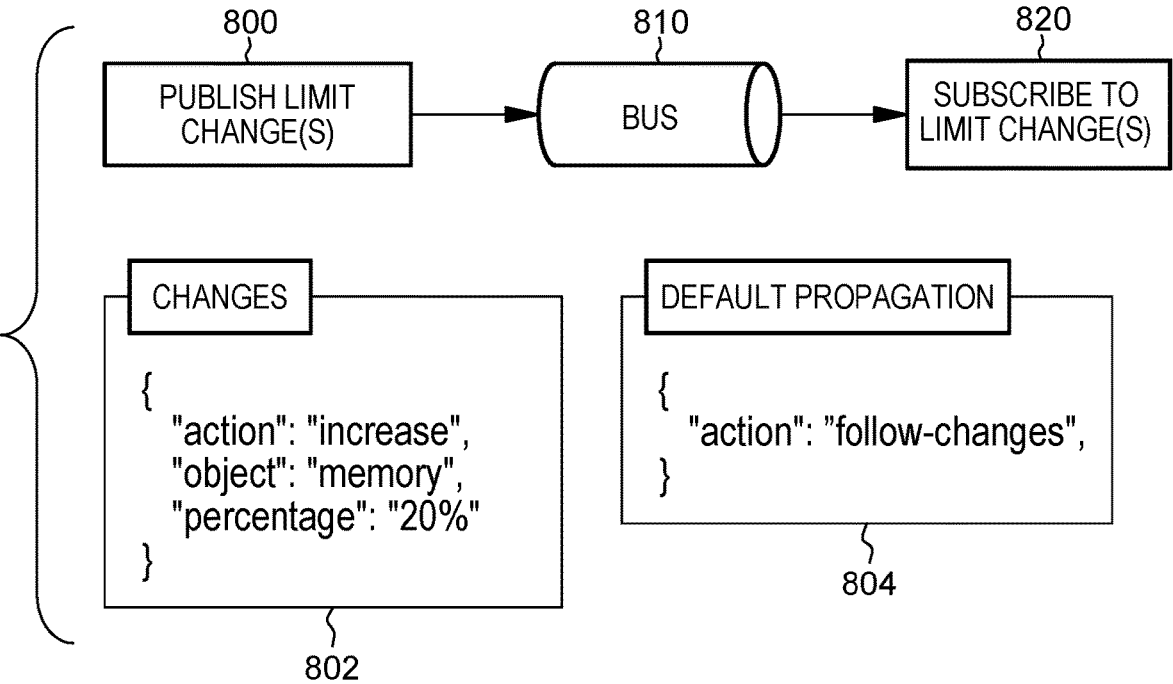
FIG. 8 depicts an example of a workflow of the message service component of the control system of FIG. 4, in accordance with one or more aspects of the present invention.

FIG. 8 is an example workflow of publishing and subscribing to limit event changes. A message service component publishes a limit change 800 across a bus 810 to a message service subscriber that subscribes to related resource limit changes. The subscribe to limit change(s) 820 can customize which service change events are to be subscribed to, for instance, which services are related, and take actions when a limit event change is received. The publish limit change(s) 800 facility can publish when a limit change occurs, and send a change event to the channel or bus 810. For example, memory limit increased by 20%, can be indicated in the change event payload 802, which can be default-propagated to subscribers 804.

Figure 9:
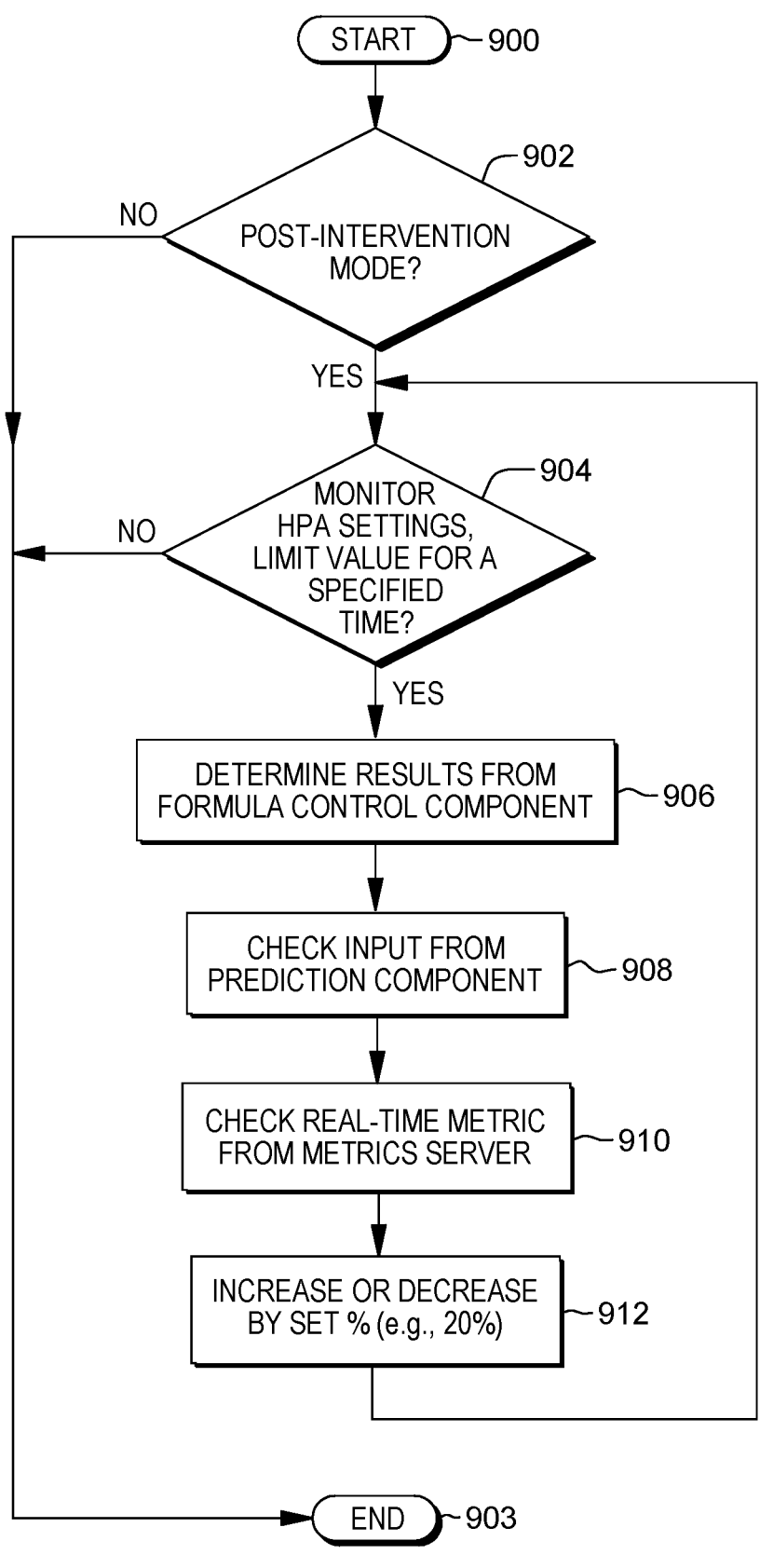
FIG. 9 depicts an example of a workflow of the vertical pod auto-scaler (VPA) engine component of the control system of FIG. 4, in accordance with one or more aspects of the present invention.

As noted, in one or more implementations, the dynamically adjusting of a pod resource limit of a container orchestration platform pod can be propagated for dynamically adjusting one or more pod resource limits of one or more other container orchestration platform pods in the computing environment. The dynamic change in a pod resource limit can work in association with the horizontal pod auto-scaling component, and can be further based on an auto-scaling mode of the container orchestration platform pod. For instance, a post-intervention mode can be configured as a mode where the control system is to intervene when the HPA divides by an existing pod instance value for a set period of time, that is, where a number of instances of a container orchestration platform pod stay at a specified pod instance limit for a set period of time. For example, the HPA component can be defined such that the expected memory usage is 80%, with a minimum of 3 pod instances and a maximum of 9 pod instances. The control system can intervene when the number of instances stays at 3 or 9 for a long time. For example, where the number of instances is 9 for a long period of time, it means that the memory allocation may be too small. Based on this, the control system can be configured to dynamically increase the memory limit by 20% (or another customized value). After running for a period of time, processing then checks whether the number of pod instances has decreased. If not, memory can continue to be increased by 20% until the number of pod instances reduces. FIG. 9 depicts one example of this process.

As illustrated in FIG. 9, processing starts 900 with detecting the auto-scaling mode, and in particular, in determining whether the mode is a post-intervention mode 902. If "no", then processing ends 903 in the workflow of FIG. 9. Otherwise, in the post-intervention mode, processing monitors the HPA minimum and maximum pod instance settings, and determines whether the instances are at a limit value for a set period of time, such as for a specified (long) time interval 904. If "no", then processing ends 903. Otherwise, the process determines results for adjusting a pod resource limit from the formula control manager 906 of the control system, and checks the predicted upcoming resource usage value for the container orchestration platform pod obtained from the prediction component using the trained machine learning model 908. Further, runtime data usage metrics of the metrics server 430 are checked 910, and a determination is made whether to increase or decrease a pod resource limit by, for instance, a set percentage, such as 20% 912 (in one example). After increasing or decreasing the limit by the set percentage, processing returns to monitor the HPA setting(s)

and determine whether the number of pod instances continue to remain at the limit for the specified length of time.

As a specific example, assume the HPA definition is as follows:

```
minReplicas: 3 (Min Pod)
maxReplicas: 9 (Max Pod)
metrics:
- type: Resource
  resource:
    name: memory
    target:
      type: Utilization
      averageUtilization: 80 (80% with expected memory usage rate).
```

Further, the dynamic resource definition for the pod could be, in one example:

```
    resources:
      hpaMode:
        mode: post-in (use HPA first)
        increment: 20% (per once)
        stabilizationWindowMinute: 120 (stable window)
      upper limits:
        memory: avg(last(30days))* 2 or 100Mi (Twice the
        average of the last
        30 days or 100Mi)
        max: 300Mi (Max300Mi)
      lower limits:
        memory: avg(last(30days)) * 0.5 or 10Mi (Half the
        average of the last
        30 days or 10Mi)
        max: 50Mi (Max 50Mi).
```

For the above example, where the HPA is defined such that the expected memory usage is 80%, with a minimum of 3 pod instances and a maximum of 9 pod instances, the control system can intervene when the number of instances stays at 3 or 9 for a set period of time, for instance, for a set long period of time (e.g., an hour or more). For example, the number of pod instances remaining at 9 for a long time means that memory allocation may be too small, and as noted, the memory can be increased by a custom value, such as 20%. After running for a period of time, processing monitors whether the number of pod instances has decreased, and if not, continues to increase the memory limit allocations to the pods until the number of pod instances reduces.

Figure 10:
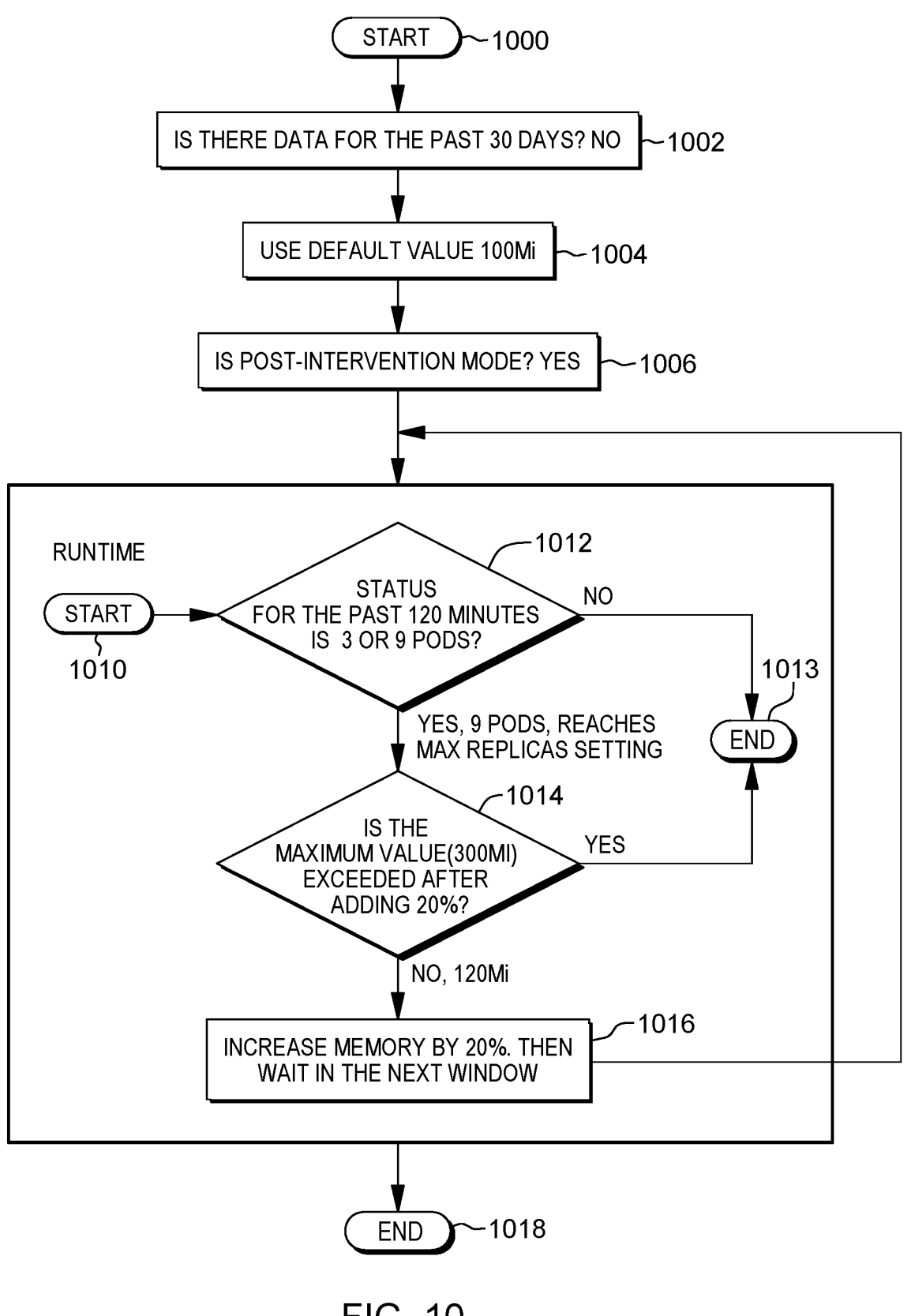
FIG. 10 is a further example workflow of the vertical pod auto-scaler engine component of the control system of FIG. 4, in accordance with one or more aspects of the present invention.

FIG. 10 depicts another example of the above-noted processing. This example assumes that, for instance, normal workload uses 5 pod instances, with each instance using 230 Mi of memory. The default value at initialization and deployment of a pod may be 100 Mi. In this situation, processing starts 1000 with determining whether there is historical resource usage data for the pod for the past 30 days (that is, in the example where the resource usage formula references the past 30 days of resource usage). Assuming not, then the default value of 100 Mi is used for initialization and deployment of the container orchestration platform pod. Further, processing determines that the auto-scaling mode is the post-intervention mode 1006. At start 1010 of runtime, processing determines pod instance status for a time interval, for instance, the last 120 minutes 1012, and determines whether the number of pod instances is at either limit, for instance, 3 pods or 9 pods in the example above. If not, then processing ends 1013. In the example above, after running for a period of time after deployment (for instance, 120 minutes), it is determined that the number of pod instances has increased to 9, which is the maximum allowed by the HPA definition in this example. Once the deployed replica count reaches the max replica setting, then the VPA will be enabled to check the pod resource usage, in one embodiment. For instance, where processing is at a pod instance limit, such as 9 pod instances, which is a maximum replica setting in this example, VPA processing determines whether the maximum value of memory usage would be exceeded with, for instance, a 20% increase in the assigned pod memory limit 1014. If "yes", then processing ends 1013. Otherwise, the pod memory limit is increased, for instance, by 20%, after which processing waits for a next evaluation window to repeat the process 1016, with the process discontinuing, in one embodiment, with discontinuing of runtime 1018.

In another mode, the auto-scaling mode can be a first-in mode, in which case, the dynamic pod resource limit settings are applied first, and the horizontal pod auto-scaler processing is not applied until it is detected that an indicator, such as pod CPU usage or pod memory usage is at a limit, and does not change significantly over a specified length of time.

Those skilled in the art will note from the description provided herein that, in one aspect, a computer-implemented method of facilitating processing within a computing environment is provided. The computer-implemented method includes: deploying a container orchestration platform pod with one or more pod resources in the computing environment. The pod resources have associated therewith one or more pod resource limits. Further, the computer-implemented method includes monitoring a runtime resource usage of the container orchestration platform pod and predicting, by a trained machine learning model, upcoming resource usage of the container orchestration platform pod, the predicting using, at least in part, the monitored runtime resource usage. In addition, the computer-implemented method includes dynamically adjusting a pod resource limit of the one or more pod resource limits of the container orchestration platform pod in the computing environment. The dynamically adjusting is based on the monitored runtime resource usage, and the predicted upcoming resource usage. Advantageously, processing is facilitated within a container architecture-based computing environment by providing enhanced use of resources. By dynamically adjusting pod resource limits, cost efficient usage of computing resources is provided, along with effective and dynamic utilization of resources, which supports on-demand resource allocation without unnecessary waste of resources. Further, the process saves costs, lowers carbon footprint, and reduces energy consumption by more efficiently using computing resources in a container-based computing environment.

In one implementation, the computer-implemented method further includes obtaining the trained machine learning model by training a machine learning model on historical resource usage data of the container orchestration platform pod. Further, in one embodiment, the computer-implemented method further includes using the predicted upcoming resource usage of the container orchestration platform pod in continuing training of the trained machine learning model. In one example, the machine learning model includes a linear regression model. Advantageously, predicting, using the trained machine learning model, upcoming resource usage of the container orchestration platform pod, facilitates the dynamically adjusting of the pod resource limit of the container orchestration platform pod to provide, for instance, the cost efficient usage of computing resources, and effective and dynamic utilization of resources, and to support on-demand resource allocation without waste of resources.

In one implementation, the deploying includes initializing and deploying the container orchestration platform pod. The initialing and deploying includes, for instance, obtaining a dynamic resource definition to be used in dynamically allocating pod resources for the container orchestration platform pod being deployed. The dynamic resource definition includes a resource usage formula. Further, the initializing and deploying includes creating a deployment object to be used in deploying the container orchestration platform pod. In one embodiment, the creating includes parsing the resource usage formula of the dynamic resource definition, and generating, based on parsing the resource usage formula of the dynamic resource definition, one or more initial pod resource limits for use with initializing the container orchestration platform pod. Further, the initializing and deploying includes initialing and deploying the container orchestration platform pod with the one or more pod resources in the computing environment, the initializing applying the generated one or more initial pod resource limits to the deploying of the container orchestration platform pod with the one or more pod resources. Advantageously, generating the one or more initial pod resource limits for use with initializing the container orchestration platform pod based on the resource usage formula of the dynamic resource definition further enhances use of resources by, for instance, setting initial pod resource limits via the resource usage formula to efficiently initialize the container orchestration platform pod with the appropriate pod resource limits.

In one implementation, the monitored runtime resource usage includes runtime central processing unit usage of the container orchestration platform pod and runtime memory usage of the container orchestration platform pod. Advantageously, dynamically adjusting the pod resource limit based on runtime central processing unit (CPU) usage and runtime memory usage of the container orchestration platform pod more efficiently uses computing resources in the container-based computing environment, and thereby saves processing costs, lowers carbon footprint, and reduces energy consumption.

In one embodiment, the dynamically adjusting includes dynamically increasing during runtime the pod resource limit of the container orchestration platform pod in the computing environment. In another implementation, the dynamically adjusting includes dynamically decreasing during runtime the pod resource limit of the container orchestration platform pod in the computing environment. Advantageously, dynamically increasing and/or decreasing during runtime the pod resource limit of the container orchestration platform pod in the computing environment provides cost efficient usage of computing resources, as well as effective and dynamic utilization of resources, and supports on-demand resource allocation without allocating unnecessary resources.

In one implementation, the dynamically adjusting is further based on an auto-scaling mode of the container orchestration platform pod. In one example, where the auto-scaling mode is a post-intervention mode, the dynamically adjusting is further based on a number of instances of the container orchestration platform pod staying at a specified pod instance limit for a set period of time. In another example, where the auto-scaling mode is a first-in mode, the dynamically adjusting proceeds before auto-scaling of a number of instances of the container orchestration platform pod. Advantageously, dynamically adjusting of the pod resource limit based on the auto-scaling mode provides an ability to dynamically adjust pod resource limits, post-horizontal pod auto-scaling, or pre-horizontal pod auto-scaling. This further enhances effective and dynamic utilization of resources to, for instance, better balance processing of load, and avoid inefficient system operation, such as slow running of the computing system.

In one implementation, the computer-implemented method further includes dynamically adjusting one or more pod resources of one or more other container orchestration platform pods in the computing environment based on the dynamically adjusting of the pod resource limit of the container orchestration platform pod. Advantageously, dynamically adjusting one or more pod resources or one or more other container orchestration platform pods in the computing environment based on the dynamic adjusting of the pod resource limit facilitates resource scalability within the computing environment by scaling-up and/or scaling-down resources across multiple container orchestration platform pods based on needs within the container-based computing environment. This facilitates processing within the container architecture-based computing environment, and enhances use of resources. Further, the dynamic utilization of resources across multiple container orchestration platform pods better balances processing of the load and enhances efficient operation of the container-based computing environment.

Advantageously, disclosed herein are computer-implemented methods, computer systems and computer program products which facilitate controlling resource limits for container orchestration platform pods using dynamic data analysis and machine-learning-model-based prediction. The processing can include, in one or more aspects, dynamic resource allocation through the use of trained formulas, dynamic predicting of incoming workload or traffic, and initiating scaling action in advance by collecting historical usage data, and runtime data, as input for the trained machine learning model prediction, and dynamically configuring resources of a call chain of a microservice, and introducing different modes of integration with the horizontal pod auto-scaler, including a post-intervention mode, and a first-in mode. In one or more implementations, the computer-implemented methods, computer systems and computer program products disclosed herein effectively avoid excessive resource allocation and waste of resources within the container-based computing environment. Further, resource allocation is more need-based, reducing request accumulation and/or service interruption caused by insufficient resources. Further, lower technical barriers and reduced reliance on experts are achieved with dynamic pod resource limit adjusting based on data analysis such as described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:
    initializing a container orchestration platform pod to be deployed, the initializing comprising:
        obtaining a dynamic resource definition comprising a resource usage formula to be used in dynamically allocating pod resources for the container orchestration platform pod to be deployed;
        parsing the resource usage formula of the dynamic resource definition and generating, based on parsing the resource usage formula, one or more initial pod resource limits;
    deploying the container orchestration platform pod with one or more pod resources in the computing environment, the one or more pod resources having associated therewith the generated one or more initial pod resource limits;
    monitoring a runtime resource usage of the container orchestration platform pod;
    predicting, by a trained machine learning model, a value of upcoming resource usage of the container orchestration platform pod, the predicting using, at least in part, the monitored runtime resource usage; and
    dynamically adjusting a pod resource limit of the one or more pod resource limits of the container orchestration platform pod in the computing environment, the dynamically adjusting being based on the monitored runtime resource usage, and the predicted value of upcoming resource usage.

2. The computer-implemented method of claim 1, further comprising obtaining the trained machine learning model by training a machine learning model on historical resource usage data of the container orchestration platform pod.

3. The computer-implemented method of claim 2, further comprising using the predicted upcoming resource usage of the container orchestration platform pod in continuing training of the trained machine learning model.

4. The computer-implemented method of claim 2, wherein the machine learning model comprises a linear regression model.

5. The computer-implemented method of claim 1, wherein the deploying further comprises
    creating a deployment object to be used in deploying the container orchestration platform pod; and
    initializing and deploying the container orchestration platform pod with the one or more pod resources in the computing environment, the initializing applying the generated one or more initial pod resource limits to the deploying of the container orchestration platform pod with the one or more pod resources.

6. The computer-implemented method of claim 1, wherein the monitored runtime resource usage comprises runtime central processing unit usage of the container orchestration platform pod and runtime memory usage of the container orchestration platform pod.

7. The computer-implemented method of claim 1, wherein the dynamically adjusting comprises dynamically increasing during runtime the pod resource limit of the container orchestration platform pod in the computing environment.

8. The computer-implemented method of claim 1, wherein the dynamically adjusting comprises dynamically decreasing during runtime the pod resource limit of the container orchestration platform pod in the computing environment.

9. The computer-implemented method of claim 1, wherein the dynamically adjusting is further based on an auto-scaling mode for the container orchestration platform pod.

10. The computer-implemented method of claim 9, wherein the auto-scaling mode is a post-intervention mode, and the dynamically adjusting is further based on a number of instances of the container orchestration platform pod staying at a specified pod instance limit for a set period of time.

11. The computer-implemented method of claim 9, wherein the auto-scaling mode is a first-in mode, and the dynamically adjusting proceeds before auto-scaling of a number of instances of the container orchestration platform pod.

12. The computer-implemented method of claim 1, further comprising dynamically adjusting the one or more pod resource limits of one or more other container orchestration platform pods in the computing environment based on the dynamically adjusting of the pod resource limit of the container orchestration platform pod.

13. A computer system for facilitating processing within a computing environment, the computer system comprising:
    a memory; and
    at least one processor in communication with the memory, wherein the computer system is configured to perform a method, the method comprising:
        initializing a container orchestration platform pod to be deployed, the initializing comprising:
            obtaining a dynamic resource definition comprising a resource usage formula to be used in dynamically allocating pod resources for the container orchestration platform pod to be deployed;
            parsing the resource usage formula of the dynamic resource definition and generating, based on parsing the resource usage formula, one or more initial pod resource limits;
        deploying the container orchestration platform pod with one or more pod resources in the computing environment, the one or more pod resources having associated therewith the generated one or more initial pod resource limits;

monitoring a runtime resource usage of the container orchestration platform pod;

predicting, by a trained machine learning model, a value of upcoming resource usage of the container orchestration platform pod, the predicting using, at least in part, the monitored runtime resource usage; and dynamically adjusting a pod resource limit of the one or more pod resource limits of the container orchestration platform pod in the computing environment, the dynamically adjusting being based on the monitored runtime resource usage, and the predicted value of upcoming resource usage.

14. The computer system of claim 13, further comprising obtaining the trained machine learning model by training a machine learning model on historical resource usage data of the container orchestration platform pod.

15. The computer system of claim 13, wherein the deploying further comprises creating a deployment object to be used in deploying the container orchestration platform pod; and initializing and deploying the container orchestration platform pod with the one or more pod resources in the computing environment, the initializing applying the generated one or more initial pod resource limits to the deploying of the container orchestration platform pod with the one or more pod resources.

16. The computer system of claim 13, wherein the dynamically adjusting is further based on an auto-scaling mode for the container orchestration platform pod.

17. The computer system of claim 16, wherein the auto-scaling mode is a post-intervention mode, and the dynamically adjusting is further based on a number of instances of the container orchestration platform pod staying at a specified pod instance limit for a set period of time.

18. The computer system of claim 16, wherein the auto-scaling mode is a first-in mode, and the dynamically adjusting proceeds before auto-scaling of a number of instances of the container orchestration platform pod.

19. The computer system of claim 13, further comprising dynamically adjusting the one or more pod resource limits of one or more other container orchestration platform pods in the computing environment based on the dynamically adjusting of the pod resource limit of the container orchestration platform pod.

20. A computer program product for facilitating processing within a computing environment, the computer program product comprising:

one or more computer-readable storage media and program instructions embodied therewith, the program instructions being readable by a processing circuit to cause the processing circuit to perform a method comprising:

initializing a container orchestration platform pod to be deployed, the initializing comprising:

obtaining a dynamic resource definition comprising a resource usage formula to be used in dynamically allocating pod resources for the container orchestration platform pod to be deployed;

parsing the resource usage formula of the dynamic resource definition and generating, based on parsing the resource usage formula, one or more initial pod resource limits;

deploying the container orchestration platform pod with one or more pod resources in the computing environment, the one or more pod resources having associated therewith the generated one or more initial pod resource limits;

monitoring a runtime resource usage of the container orchestration platform pod;

predicting, by a trained machine learning model, a value of upcoming resource usage of the container orchestration platform pod, the predicting using, at least in part, the monitored runtime resource usage; and dynamically adjusting a pod resource limit of the one or more pod resource limits of the container orchestration platform pod in the computing environment, the dynamically adjusting being based on the monitored runtime resource usage, and the predicted value of upcoming resource usage.

* * * * *